(12) United States Patent
Weiss

(10) Patent No.: US 7,568,200 B2
(45) Date of Patent: *Jul. 28, 2009

(54) COMPUTER-IMPLEMENTED METHOD AND APPARATUS FOR INVENTORY MANAGEMENT

(75) Inventor: Morris D. Weiss, San Antonio, TX (US)

(73) Assignee: HaveNeed.com, Inc., San Antonio, TX (US)

( * ) Notice: Subject to any disclaimer, the term of this patent is extended or adjusted under 35 U.S.C. 154(b) by 605 days.

This patent is subject to a terminal disclaimer.

(21) Appl. No.: 11/113,788

(22) Filed: Apr. 25, 2005

(65) Prior Publication Data

US 2005/0197907 A1 Sep. 8, 2005

Related U.S. Application Data

(63) Continuation of application No. 09/704,973, filed on Nov. 2, 2000, now Pat. No. 6,904,410.

(51) Int. Cl.
G06F 9/46 (2006.01)
G06F 17/30 (2006.01)
G06F 17/00 (2006.01)
G06Q 30/00 (2006.01)
G06Q 10/00 (2006.01)

(52) U.S. Cl. ............................ 718/106; 705/26; 705/27; 705/28; 707/10; 715/273

(58) Field of Classification Search ................. 719/328; 705/26–28; 718/106; 707/10; 715/273
See application file for complete search history.

(56) References Cited

U.S. PATENT DOCUMENTS

| | | | | |
|---|---|---|---|---|
| 5,083,638 A | * | 1/1992 | Schneider | 186/61 |
| 5,727,158 A | * | 3/1998 | Bouziane et al. | 709/225 |
| 5,845,265 A | * | 12/1998 | Woolston | 705/37 |
| 5,936,860 A | * | 8/1999 | Arnold et al. | 700/95 |
| 6,466,915 B1 | * | 10/2002 | Suzuki et al. | 705/14 |
| 6,636,863 B1 | * | 10/2003 | Friesen | 707/102 |
| 7,222,087 B1 | * | 5/2007 | Bezos et al. | 705/26 |
| 2002/0032699 A1 | * | 3/2002 | Edwards et al. | 707/513 |
| 2002/0054101 A1 | * | 5/2002 | Beatty | 345/764 |

OTHER PUBLICATIONS

Mayfield, Kendra. "E-Books' Full Court Press". Wired. Aug. 28, 2000. p. 1/2. Internet site: http://www.wired.com/science/discoveries/news/2000/08/38432.*

* cited by examiner

Primary Examiner—Meng-Ai An
Assistant Examiner—Camquy Truong
(74) Attorney, Agent, or Firm—Richard Auchterlonie; Novak Druce & Quigg, LLP

(57) ABSTRACT

A list of object classes is displayed to the user, and next to each listed object class, a first button is displayed for the user to click on to add, to the user's inventory, instances of the listed object class that the user has. Also, next to the each listed object class, a second button is displayed for the user to click on to identify instances of the listed object class that the user would like to buy. The first button is labeled with a number indicating how many instances of the listed object class that the user has. In a preferred implementation, the second button is labeled with a number indicating how many instances of the listed object class that the user would like to buy, and a third button is labeled with a number indicating how may instances of the listed object class that the user would like to sell.

5 Claims, 18 Drawing Sheets

US 7,568,200 B2

COMPUTER-IMPLEMENTED METHOD AND APPARATUS FOR INVENTORY MANAGEMENT

RELATED APPLICATIONS

The present application is a continuation of Morris D. Weiss et al., U.S. Ser. No. 09/704,973 filed Nov. 2, 2000, entitled "Online Method and System for Management of Collectibles," issued on Jun. 7, 2005, as U.S. Pat. No. 6,904,410, incorporated herein by reference.

BACKGROUND OF THE INVENTION

1. Field of the Invention

The invention relates to a computer-implemented method and apparatus for inventory management.

2. Background Art

Prior to the introduction of the Internet (i.e., the World Wide Web), collectors and businesses catering to collectors used a variety of services and methods for managing their collectibles. Books, magazines, and catalogs provided information about collectibles. Avid collectors formed clubs, and traded collectibles at club meetings, auctions, flea markets, and through classified ads. Many businesses and professionals became devoted to servicing collectors. These businesses and professionals included specialty shops, auction houses, dealers, and appraisers. Other businesses, such as insurance companies, major retailers, and publishers, had a significant portion of their business devoted to servicing collectors.

With the introduction of personal computers and the Internet, a variety of software and online services have become available to collectors. These include software and online services for cataloging certain categories of collectibles contained in personal collections.

The management of large collections introduces a problem of requiring users to navigate through a variety of display screens for the various features. Ease of navigation is especially important for attracting new users and inducing them to enter information about their collections into an electronic database. Another significant attribute is educating the collector of the items that may potentially be available.

SUMMARY OF THE INVENTION

In accordance with one aspect, the invention provides a computer-implemented method of a user managing an inventory of different kinds of things that the user has. The different kinds of things are instances of object classes defined in a computer-implemented database of object classes. The inventory of the different kinds of things that the user has is stored in at least one computer-implemented database of user information. The method includes providing access of the user to the user's inventory for inspecting and adding instances to the user's inventory by displaying to the user a list of object classes from the database of object classes, and next to an identification of each listed object class, displaying a first button for the user to click on to add, to the user's inventory, instances of the listed object class that the user has, and next to the identification of each listed object class, also displaying a second button for the user to click on to identify instances of the listed object class that the user would like to buy. The method further includes labeling the first button with a number indicating how many instances of the listed object class that the user has.

In accordance with another aspect, the invention provides an apparatus for permitting a user to access a site on the Internet. The site is accessible to a multiplicity of users for managing inventories of different kinds of things that the users have. The different kinds of things are instances of object classes defined in a computer-implemented database of object classes. The inventories of the different kinds of things that the users have are stored in at least one computer-implemented database of user information. The apparatus includes at least one processor programmed for providing access of a user to the user's inventory for inspecting and for adding instances to the user's inventory by displaying to the user a list of object classes from the database of object classes, and next to an identification of each listed object class, displaying a first button for the user to click on to add, to the user's inventory, instances of the listed object class that the user has, and next to the identification of each listed object class, also displaying a second button for the user to click on to identify instances of the listed object class that the user would like to buy, and for labeling the first button with a number indicating how many instances of the listed object class that the user has.

DESCRIPTION OF ILLUSTRATIVE EMBODIMENTS

Figure 1:
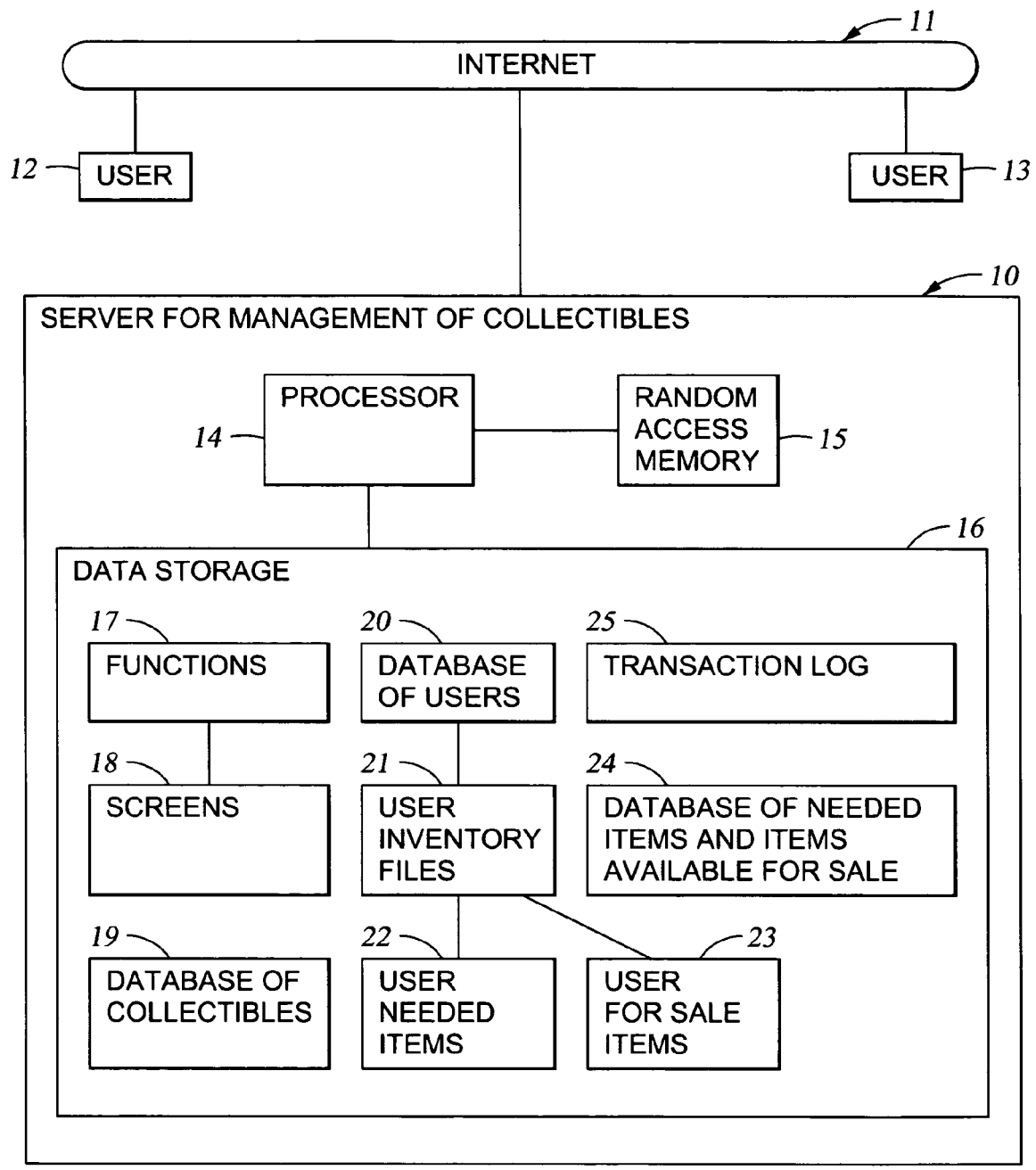
FIG. 1 is a block diagram of a system that uses a single server for management of collectibles.

FIG. 1 shows a block diagram of an online system for management of collectibles. In this example, the system is implemented by programming a network server generally designated 10. The server 10 is linked to the Internet 11 to service a number of users 12, 13. The server 10 is shown having a processor 14, random access memory 15, and data storage 16. The data storage 16, for example, includes an array of conventional disk drives. The data storage stores a number of programs and data files, including programs for various functions 17, display screen data structures 18, a database of collectibles 19, a database of registered users 20, and user inventory files 21. Associated with the user inventory files are user-needed items 22 and user for sale items 23. Sample data file formats are provided in Appendix I below.

One of the functions 17 is a "Bot" function in which a user needing an item or having an item available for sale, can obtain the needed item from another user or sell the available item to another user. Instead of searching the users' inventory files, the "Bot" function accesses any relevant information about needed and items available for sale in a separate database 24 organized especially for the "Bot" function. Updates to the database 24 are protected by a transaction log 25, which maintains a history of the changes made to the database. The transaction log can be accessed by a background routine for compiling statistical information such as a market price for items that are frequently traded.

Figure 2:
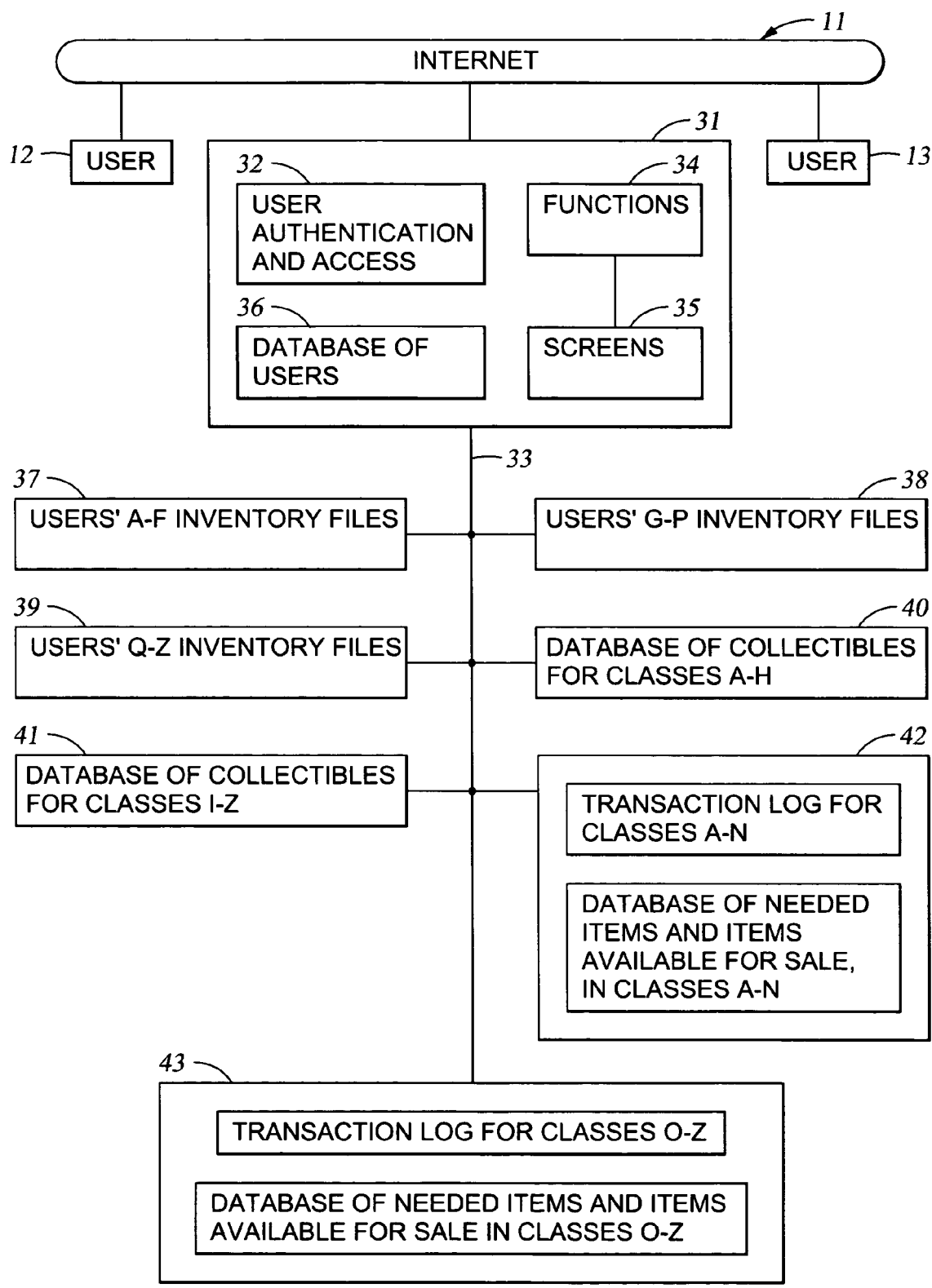
FIG. 2 is an alternative embodiment that uses an intranet of servers for management of collectibles.

It is possible that the databases for the on-line system for management of collectibles could exceed the capacity of even a very high capacity network server. In this case, the databases could be split-up and put in separate servers as shown in FIG. 2. For example, a first server 31 provides user authentication and access 32 to a number of other servers in a network 33. This server 31 includes functions 34, screens 35, and a database of users 36.

In the system of FIG. 2, the user inventory files are spread over three servers 37, 38 and 39 in terms of the first letter of the usename. For example, user inventory files for users with names beginning with A to F are in the server 37, user inventory files for users with names beginning with G to P are stored in a second server 38, and user inventory files for users having user names beginning with Q to Z are stored in a third server 39. In a similar fashion, the database of collectibles is divided among two servers 40 and 41 by the first alphabetic letter of the primary class of the collectibles. As further described below with reference to FIG. 3, certain classes of the collectibles include recorded music, books, stamps, toys/games, etc. In the system of FIG. 2, the database of collectibles in classes beginning with the letters A to H are stored in a first server 40 and the database of collectibles in classes beginning with the letters I to Z are stored in a second server 41. The transaction log and database of needed and items available for sale is split by class name in a fashion similar to the splitting of the database of collectibles. For example, a first server 42 includes a transaction log for classes with class names beginning with A to N and a database of needed and items available for sale separated into classes beginning with letters A to N. A second server 43 includes a transaction log for classes beginning with the letter O to Z and a database of needed and items available for sale separated into classes beginning with O to Z.

Figure 3:
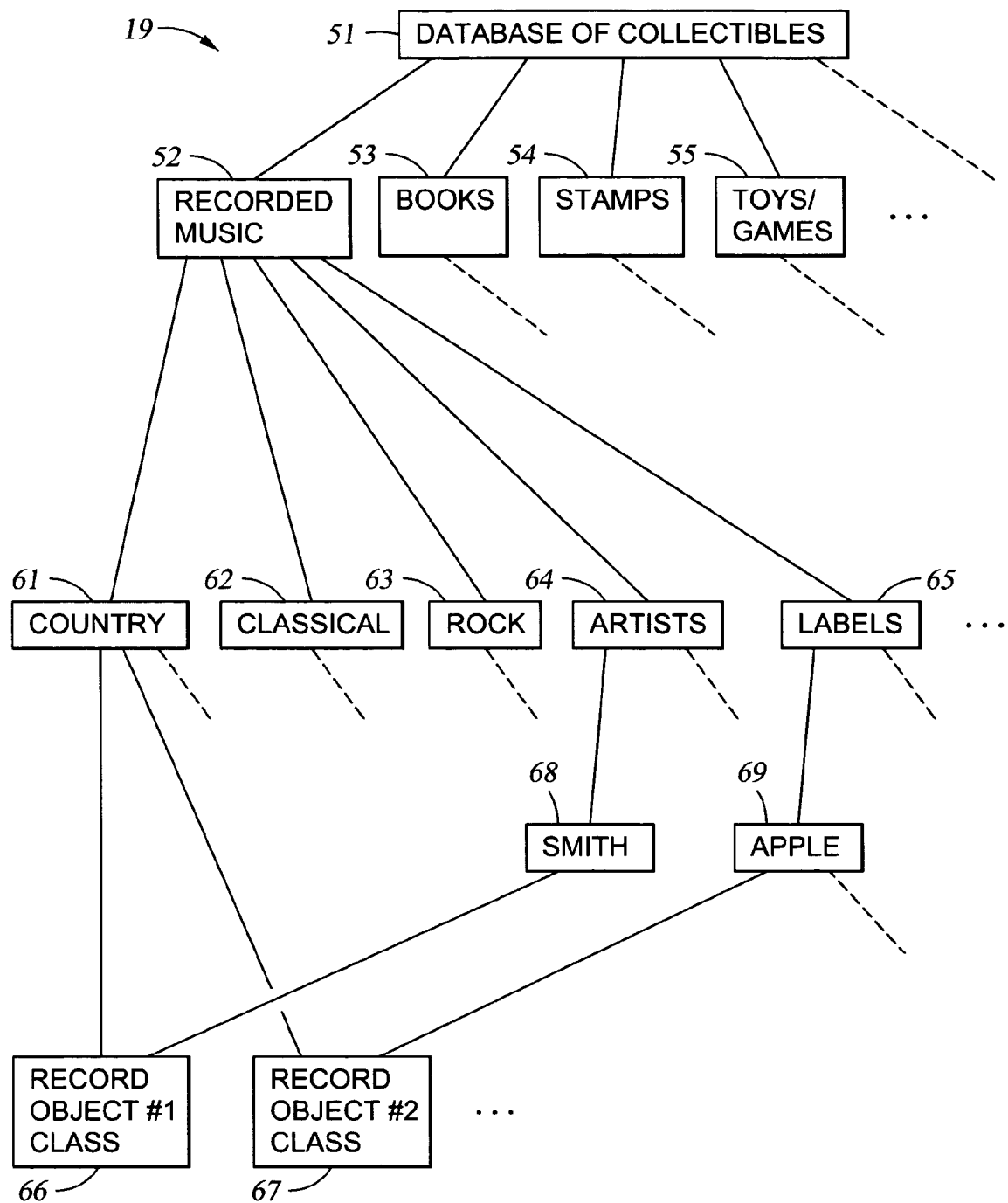
FIG. 3 is a block diagram showing a hierarchy of classes of objects in a database of collectibles.

FIG. 3 shows a data structure for the database of collectibles 19. It includes a root class 51 representing the entire database of collectibles, and primary classes 52, 53, 54, 55 representing recorded music, books, stamps, toys/games, etc. Each one of the primary classes has subclasses; for example, the class 52 of recorded music includes a subclass 61 of country, a subclass 62 of classical, a subclass 63 of rock, a subclass 64 of artists, and a subclass 65 of labels. In this example the primary classes are mutually exclusive but the subclasses are not necessary mutually exclusive. For example, there will be overlap between the subclasses of country, classical, and rock and the subclasses of artists and labels. In each subclass there is a list of object classes, which in this case are phonograph records or similar objects such as tapes or compact discs. For example, the object classes include a first record object class 66 for country music by a particular artist (i.e., Smith 68) on a particular label, and a second record object class 67 by a particular artist on a particular label (i.e., Apple 69).

For readers familiar with object oriented programming, the database of collectibles 19 is a seen as a hierarchy of classes ending in object classes. It does not include any object instances, although each object class can be representative of any number of similar object instances. For example, a 1991 penny with the mint mark "D" could be considered an object class, representing all of the 1991 "D" pennies from the US mint. Each object instance could have different attributes, such as whether the condition of the penny is poor, fair, good, excellent, near mint or mint or another similar grading scheme or system.

In practice, the database of collectibles 19 is implemented as a data structure of linked lists. Each node in the structure includes attributes of the node (such as a class name), a list of pointers to objects above it in the hierarchy (i.e., pointers to superiors), and a list of pointers to objects below it in the hierarchy (i.e., pointers to subordinates). Standard programming languages, such as C++, provide compilers and function libraries for producing and managing such data structures.

Figure 4:
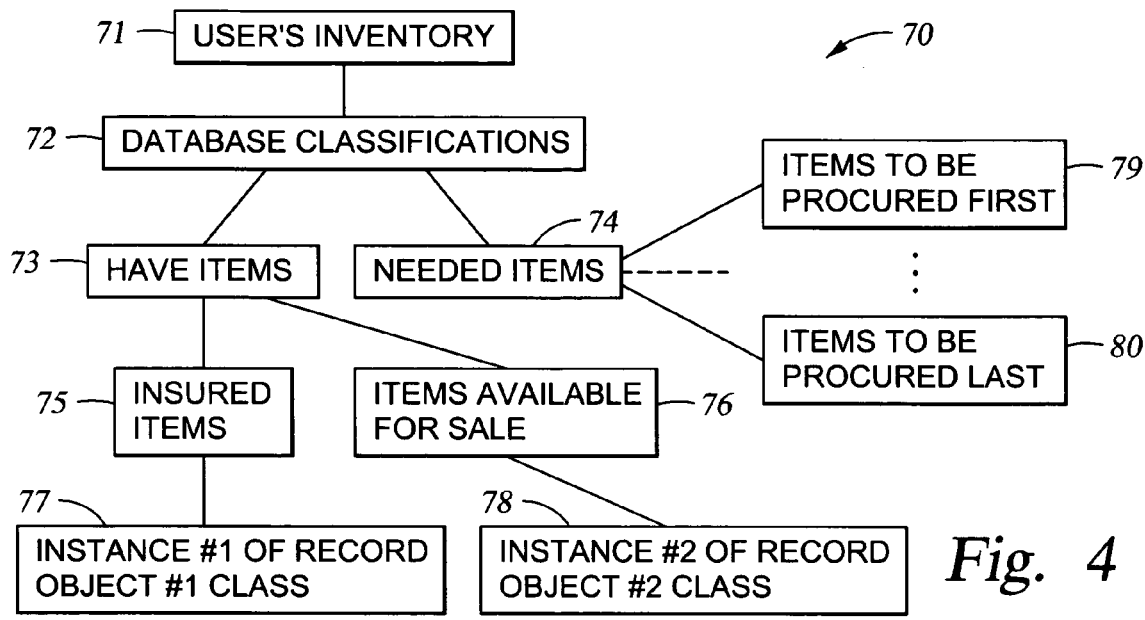
FIG. 4 is a block diagram of a user inventory data structure.

FIG. 4 is a block diagram of the data structure of a user's inventory file 70. The data structure includes a root node 71, which is the root node for the database classifications 72 of at least the classes and subclasses of the object instances in the user's inventory. An object instance will be referred to simply as a "item". The user's inventory includes items referred to as "have" items 73 (items that the user has) and "needed" 74 (items that the user wants to purchase). The "have" items 73 are further subdivided into insured items 75 and items available for sale 76. For example, the insured items include an instance number one of the first record object class 77 and an instance number two of record object number two 78. The "need" items can include items or groups of items in a hierarchy of priority including items 79 to be procured first, items 80 to be procured last, and possibly additional items or groups of items of intermediate priority. Each of the items 79 to be procured first, for example, could be procured immediately if the item is found to be available for sale by another user. Each of the items 80 to be procured last, for example, could be procured only after the user has been notified that the item is available for sale and the user then gives further approval of the sale.

Figure 5:
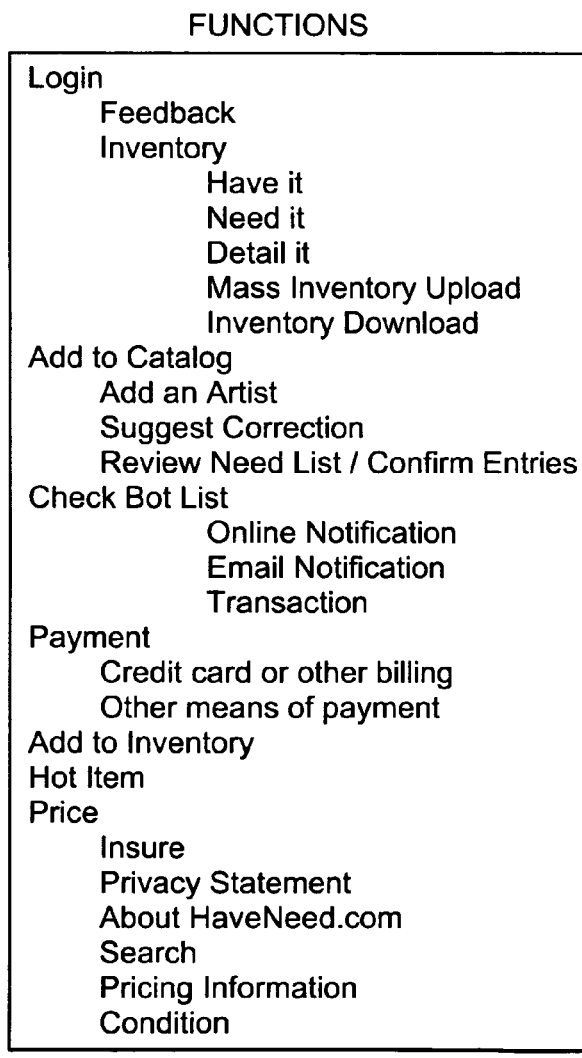
FIG. 5 is a listing of functions performed by the server for management of collectibles.

FIG. 5 shows an outline of the functions 17 provided by the online system for management of collectibles.

The "login" function accepts entry of a user id and password, in order to provide user authentication and access to all functions except browsing of the database of collectibles, obtaining information about items offered for sale, and viewing general information about the site, such as a privacy statement and information for new users about the services provided by the site. Only registered users may maintain online inventories and engage in buy-sell transactions.

The "feedback" function is provided if a transaction has been consummated and then feedback is allowed seller to buyer and buyer to seller regarding that one transaction. The feedback consists of a rating according to a scale, and the opportunity to leave a descriptive comment. The feedback rating of the particular user will be visible to other users.

The inventory "have it" function provides the user with an initial screen allowing for selection of category/subcategory. Based on that category the user can choose how to view the database of collectibles. While viewing the database of collectibles, the user may perform an inventory of the user's items, and also change how to view the database. The user may click on a green "Have" oval next to each object class in the database of collectibles to inventory their collection. Any item clicked on will assume the defaults in the user's profile unless modified by the user "detail it" function. If the user's profile indicates selling of inventory is an interest, then an additional field of sales price will be entered. If an item exists in a user's collection that is not listed in the database of collectibles, then the user can still enter the item into the user's inventory and/or make such item available for sale to other users, but the object class of the item is not available in the master database of collectibles until audited by a category specialist and "approved" for entry into the database, which would then enable other users to access this object class.

The inventory "need" function provides a way for the user to enter and edit the user's list of needed items. The user activates the inventory "need" function by clicking on a red "Need" oval next to each object class in the database of collectibles. Based on the user's profile, the user will get a notification on-line, emailed, or both, regarding needed items found and either billed to a credit card or as to which other payment arrangements need to be made. Items that are clicked "Need" must be prompted immediately for price they will pay. A price of zero is acceptable and means the user is not certain of a price and will review a list of items available meeting the condition specified and sorted by price (lowest at the top). Because a large list of needed items being fulfilled could monetarily overwhelm a user, an attribute of "immediate y/n" for a needed item or in a user's profile will determine if the deal is found and consummated immediately or if it requires email or online approval from the owner/keeper of the need list. In addition, a user will have the ability to create a hierarchy of the needed items so that the user can specify the items or group of items to be procured first, second, third, etc. The need lists will also be reviewed periodically to make sure they are current. If no changes to a user's inventory or need list occur in a certain period of time, then an automatic email response system requests the user to verify the status of the need list items. Unless the user logs in and puts the need list back in active status, the need list will be deactivated.

The inventory "detail it" function is activated by the user clicking on a "detail it" button. The "detail it" function shows defaults associated with each item and permits the user to change the defaults. For example, a user may typically collect items in "very good" condition, and in this case the user's profile may set a default for all items in such user's inventory (the "Have" list) will be very good, unless changed by the user. Similarly, all items that such user seeks to purchase in that object class (the "Need" list) will only match items that are offered in a condition of "very good" or better, unless changed by the user. In a similar fashion, the user's profile may indicate whether or not selling of an item is typically of interest, and if not, the sales and sales price fields may not appear, unless and until changed by the user. Further, the user's profile may indicate whether or not purchases typically should be transacted either immediately when a desired item is found available, or only after further approval of the user is sought, especially if some time passes between the posting of a request for an item and when an appropriate item is found.

The "mass inventory upload" function displays a screen allowing the user to specify a local file that has ASCII text comma delimited, XML, or other PDA accessible format representing inventory that can be uploaded into the user's online inventory file. It may also be desirable to provide a similar function that enables registered users to transfer inventory information from another Internet site to their on-line inventory file. For example, if a user purchases an item from another site, then information about the purchased item could be automatically transferred over the Internet to the user's on-line inventory file.

The "inventory—download" function displays a screen allowing the user to specify a directory for downloading the user's online inventory file for local access. The formats may be ASCII text comma delimited, XML, or other PDA accessible format.

The "add to catalog/add an artist" function displays a screen allowing the user to add to the database of collectibles. The user could enter a uniform product code (UPC) number, if available, and/or otherwise specify a description and any appropriate primary class or secondary classes for a new object class. The user can also expand the primary or secondary classes; for example, the user can add an artist. For any addition, there is an attribute "approved," which is not modifiable by the user and defaults to "N" (No) or "P" (Pending). Category specialists will review and approve suggested additions to the master database. For searching and efficiency purposes, non-approved additions to the database could be a separate table. Until approval the only viewing and inventory function that can have access to these additions is the requesting user and others granted special access by the system administrator. Before special access is granted by the system administrator, the user can add items of a newly created object class to the user's list of needed items or items available for sale list. Once approved, the newly approved items on the user's need list or sell list are also included in the database of needed and for sale items (24 in FIG. 1).

The "suggest correction" function displays a screen to the user allowing the user to suggest corrections to the database. The suggestions are placed in a queue, for review and approval or rejection by category database specialists.

The "review need list/confirm entries" function displays a series of screens describing the user's needed items. The user can edit the screens, and also delete the screens to delete the items from the user's list of needed items.

The "check Bot list" functions permit the user to communicate with a program task in the server that looks for possible buy-sell transactions among the users. In particular, when a user adds items to the user's list of needed items, or adds items to the user's list of items available for sale, a "Bot request" is received by the Bot task, and the added item is compared to information about similar items in the database of needed items and items available for sale, to determine whether a buy-sell transaction is possible, and to execute such a transaction immediately, if an immediate transaction is possible and has been authorized by the buyer and/or seller (although the seller will presumably always permit there to be an immediate transaction).

The "check Bot list—online notification" function permits the user to specify or change how the Bot task should return online notifications of a possible or consummated Bot transaction.

The "check Bot list—Email notification" function permits the user to specify or change how the Bot task should return Email notifications of a possible or consummated Bot transaction.

The "check Bot list—Transaction" function displays a screen to the user allowing the user to specify or change user-related information governing how the Bot task should execute buy-sell transactions, such as how purchased items should be delivered to the buyer.

The "Payment, credit card or other billing" function displays a screen allowing the user to enter or change credit card billing information, such as the credit card company, card number and expiration date, or other and may also allow the user to review a history of charges to the credit card account. This function may also include other methods of payment on an account.

The "Payment, other means of payment" function displays a screen that specifies other means acceptable to the seller for consummating the transaction, including the acceptance of cash, check, money order or other suitable form of payment.

The "add to inventory" function is similar to the "inventory—have it" function described above.

The "hot item" function is invoked to reevaluate an item and ignore previous responses to offers for an item and is typically invoked when someone wants to reprice an item for sale or reprice a need list item.

The "price" function appraises the user's inventory, to the extent such valuation information is available. This can be done for personal reasons or insurance purposes.

The "insure" function displays a screen from which the user may request a quote for all or part of the user's inventory. The user is prompted to choose either purchase price, market price or insurance price for the request for quotation. The user is also asked for personal information, information about the residence or building in which the items are kept, and deductible amounts, for formulating the quotation. If the user supplies the information, a request for quotation is prepared, and transmitted online to an insurance agency. The insurance agency will then seek to place the insurance with an insurance underwriter/carrier, and any quotation from an insurance carrier is then presented to the user for acceptance.

The "privacy statement" function displays a screen to the user informing the user that no information provided is used for any purpose other than helping add to a user's collection, offering for sale items that the user designates as for sale, and for obtaining an insurance quote when the user submits a request or other services offered now or in the future. The privacy statement affirms that the user's information is kept on a secure database and is not passed on to any unaffiliated third party unless disclosed and authorized, or the user specifies that an item in the user's collection is up for sale or releases information for an insurance quote.

The "about HaveNeed.com" function displays information to the user about the owner of the website providing the collectibles management system.

The "search" function provides full search capabilities across categories and classes in the database of collectibles. The database of collectibles is set up in an object-oriented fashion to index each object class by a multiplicity of fields, each field corresponding to a superior class in the database of collectibles. Therefore, searching is a relatively simple and rapid task of scanning the pointer lists for specified classes in the database, and retrieving the classes identified by the pointers. This process continues in a recursive fashion to the depth indicated by the user's search specification, or by default to the object classes at the base of the class hierarchy.

The "pricing information" function displays a screen informing the user of any services of the collectibles management system that are not provided free of charge. The screen provides the pricing structure and philosophy regarding purchases, sales, valuation, inventorying, posting items needed or items available for sale, and insurance quotes. Many of these services are contemplated to be free of charge, at least for a base level of activity. In addition, buyers could be given credits redeemable for the services that are not free (analogous to a "frequent flyer" program), and sellers could be given volume discounts for successfully selling a large number of items.

The "condition" function displays a number of screens informing the user how to determine the condition of items in the user's inventory. For example, grades may range from mint (M), near mint (NM), excellent (E), very good (VG), good (G), fair (F), to poor (P), depending upon the category of collectible being either inventoried, added to a need list or being made available for sale. The condition function provides specific definitions of these grades with respect to various primary classes of collectibles. It is anticipated that generally accepted industry grading standards will be utilized.

Figure 6:
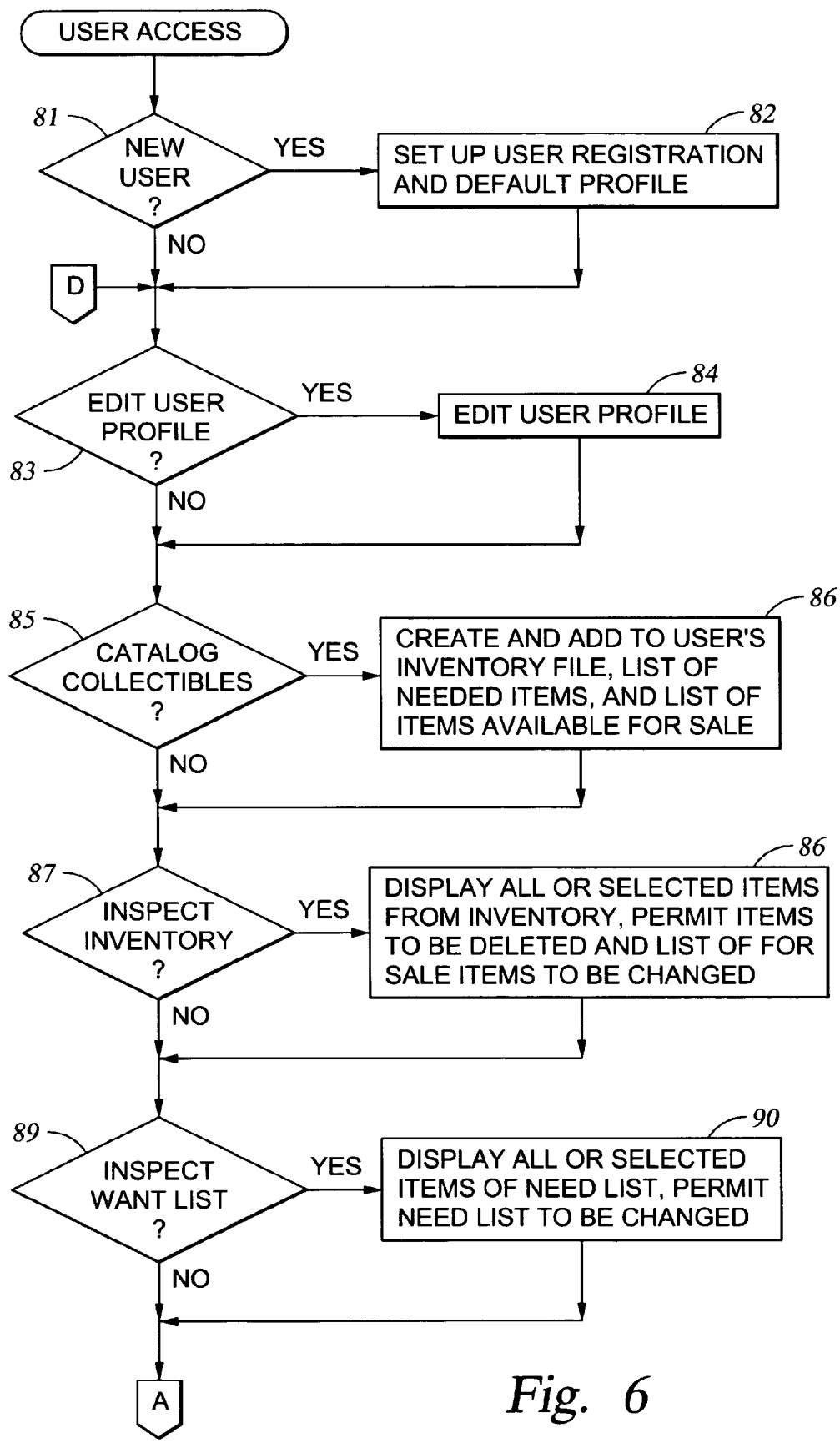
FIG. 6 is a first sheet of a flow chart showing a typical procedure followed during user access of the server for management of collectibles.

FIG. 6 shows a flowchart of a typical sequence of user access of the collectibles management system. The actual sequence of user access may vary from that shown in FIG. 6, because the user may access the various functions of the system as desired and as needed. For example, the user may select a function using a conventional tab or pull-down menu.

In step 81 of FIG. 6, execution branches to step 82 if the user is new to the collectibles management system. In step 82, the system registers the user and sets a default profile for the use. The system registers the user by receiving some information about the user, assigning a unique user id selected by the user, obtaining a password from the user, and creating a file for storing the user information and user profile. After step 82, execution continues to step 83. Execution also continues to step 83 from step 81 if the user is not a new user.

In step 83, execution branches to step 84 if the user would like to edit the user profile. In step 84, the user edits the user profile. After step 84, execution continues to step 85. Execution also continues to step 85 from step 83 if the user does not want to edit the user profile.

In step 85, execution branches to step 86 if the user would like to catalog his or her collectibles. In step 86, the system creates or adds items to the user's inventory file, and the user's list of needed items, and list of items available for sale in the user's inventory file. After step 86, execution continues to step 87. Execution also continues to step 87 from step 85 if the user does not want to catalog his or her collectibles.

In step 87, execution branches to step 88 if the user would like to display all or selected items from his or her inventory. The user selects items by paging through all items in the inventory, or by specifying a primary class, subclass, or object class to page through his or her items in the specified primary class, subclass, or object class. While paging through the items, the user may edit attributes of the items, delete items from the inventory, and change the list of items available for sale by changing an attribute of each item in the inventory indicating whether or not each item is an item available for sale. After step 88, execution continues to step 89. Execution also continues to step 89 from step 87 if the user does not want to inspect his or her inventory.

In step 89, execution branches to step 90 if the user would like to inspect his or her list of needed items. In step 90, the user selects needed items by paging through all of his or her needed items, or by specifying a primary class, subclass, or object class to page through his or her needed items in the specified primary class, subclass, or object class. While paging through the needed items, the user may edit attributes of the items, delete items from the need list, and add items to the need list. After step 90, execution continues to step 91 in FIG. 7. Execution also continues to step 91 of FIG. 7 from step 89 if the user does not want to inspect his or her need list.

Figure 7:
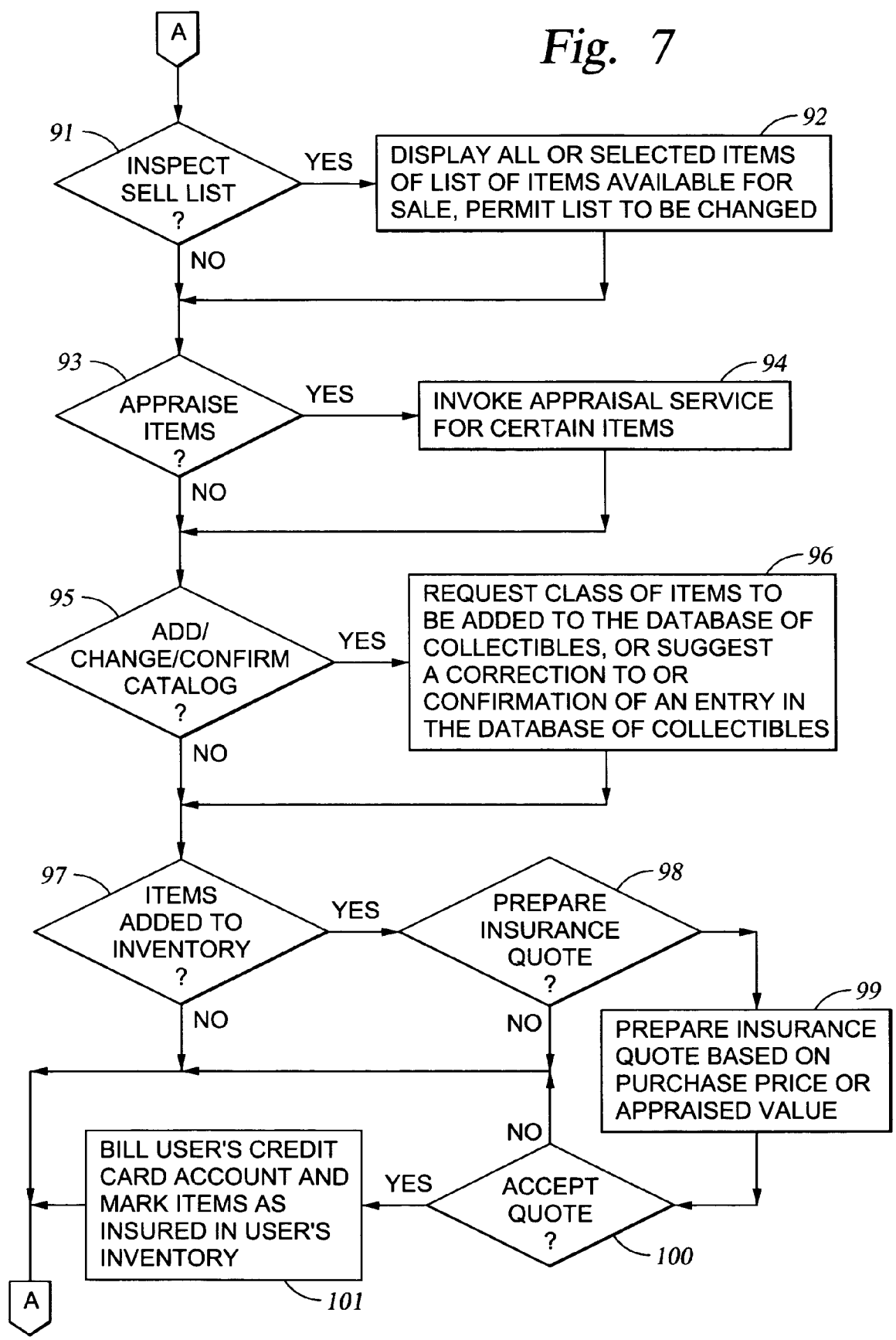
FIG. 7 is a second sheet of the flow chart begun in FIG. 6.

In step 91 of FIG. 7, execution branches to step 92 if the user would like to inspect his or her list of items available for sale. In step 92, the user selects items available for sale by paging through all of his or her items available for sale, or by specifying a primary class, subclass, or object class to page through his or her items available for sale in the specified primary class, subclass, or object class. While paging through the items available for sale, the user may edit attributes of the items, delete items from the list of items available for sale, and add items to the list of items available for sale. After step 92, execution continues to step 93. Execution also continues to step 93 from step 91 if the user does not want to inspect his or her list of items available for sale.

In step 93, execution branches to step 94 if the user would like to appraise an item or items in his or her inventory. Such items are ones that do not have a market price in the database. In step 94, the user is directed to an appraisal service appropriate for the particular item. After step 94, execution continues to step 95. Execution also continues to step 95 from step 93 if the user does not want to appraise any such items in his or her inventory.

In step 95, execution continues to step 96 if the user would like to add to or change or verify information in the database of collectibles. In step 96, the user requests a class of items to be added to the database of collectibles, or suggest a correction to the database of collectibles, or verification of information in the database of collectibles. The user, for example, requests addition of a class by clicking on a "new class" button (164 in FIG. 13) as will be further described below with reference to FIG. 14. The user requests a change or verification of information in the database of collectibles by attempting to edit the information considered in need of change or verification. For example, an entry for an object class in the database of collectibles (e.g., the listing of the Recording No. 1 or the Recording No. 2 in FIG. 10) can be selected or "blocked out" by clicking on or over it with a mouse, and the user may then be presented with a request form in which to supply a reason for the edit or the request for verification. The request for an edit or verification is forwarded to a catalog specialist for consideration and approval or disapproval in whole or in part. After step 96, execution continues to step 97. Execution also continues to step 97 from step 95 if the user does not want to add to or change the database.

In step 97, execution continues to step 98 if items have been added to the user's inventory. In step 98, the user is prompted to answer whether or not an insurance quote is desired for the items added to the user's inventory. If so, execution continues to step 99 to prepare an insurance quote based on purchase price or appraised value. The quote is prepared, for example, by electronically forwarding information to an insurance agency. When a quote has been returned to the insurance agency from an insurance underwriter/carrier, it is displayed to the user and/or an email is sent to the user advising that a quote is available and can be transmitted or displayed by following a link to the appropriate web site. In step 100, execution continues to step 101 if the user accepts the quote. In step 101, the user's credit card account is billed, and the insured items are marked as insured in the user's inventory. After step 101, execution continues to step 102 of FIG. 8. Execution also continues to step 102 of FIG. 8 from step 97 if the user does not want to add items to his or her inventory, from step 98 if the user does not want an insurance quote prepared, and from step 100 if the user does not accept the quote.

Figure 8:
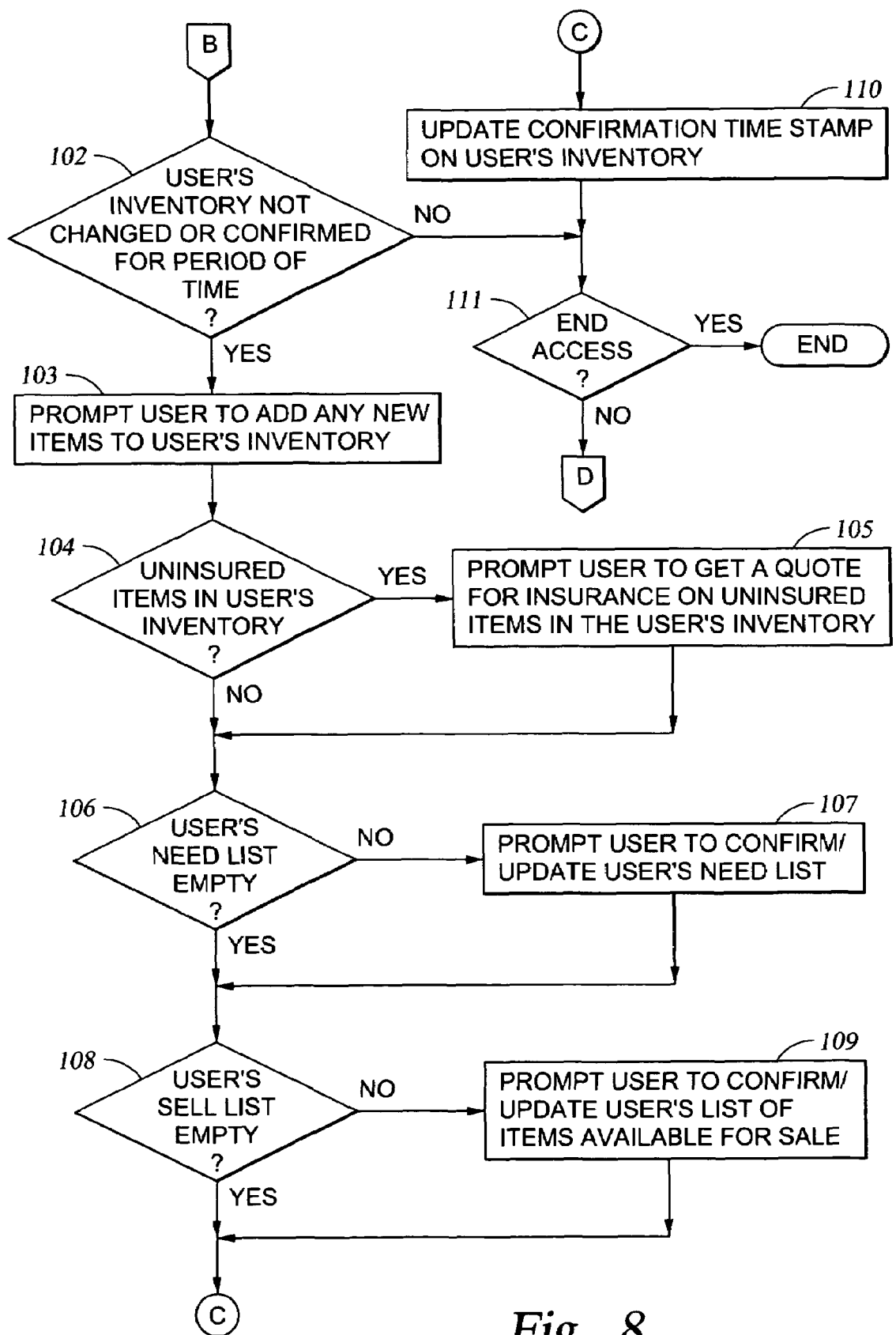
FIG. 8 is a third sheet of the flow chart begun in FIG. 6.

In step 102 of FIG. 8, the system checks whether or not the user's inventory has changed or has been confirmed within a certain period of time, such as one month. The system determines whether or not the user's inventory has changed or has been confirmed within a certain period of time by inspecting a "last modified" attribute and a "last confirmed" attribute of the user's inventory file. If the user's inventory has not been changed or confirmed for the certain period of time, then execution continues to step 103. In step 103, the user is prompted to add new items to the user's inventory. In step 104, the system checks whether there are any uninsured items in the user's inventory. If so, then execution branches to step 105 to prompt the user to get a quote for insurance on uninsured items in the user's inventory. After step 105, execution continues to step 106. Execution also continues to step 106 if there are no uninsured items in the user's inventory.

In step 106, execution branches to step 107 if the user's need list contains listed items. In step 107, the system prompts the user to confirm or update the user's need list. Once confirmed or updated, a "last modified" attribute for the need list is updated to indicate the time of the present confirmation or change. After step 107, execution continues to step 108. Execution also continues to step 108 from step 106 if the user's need list does not contain any items.

In step 108, execution branches to step 109 if the user's sell list (i.e., list of items available for sale) is not empty. In step 109, the system prompts the user to confirm or update the user's list of items available for sale. After step 109, execution continues to step 110. Execution also continues to step 110 if the user's list of items available for sale is found not to contain any items in step 108.

In step 110, the system updates a confirmation "time stamp" for the user's inventory, and then execution continues to step 111. Execution also continues to step 111 from step 102 if the user's inventory has not been changed or confirmed for the certain period of time.

In step 111, the user access to the collectibles management system is finished if the user logs off or ceases communicating with the system for a certain "timeout" period. Otherwise, execution loops back to step 83 of FIG. 6 to continue user access.

It should be apparent that when the user is logged in to the system, steps 103 to 110 are performed periodically to keep the user's account current. The system may perform a similar check for users that have not logged on for a certain period of time. For such inactive users, if their need list contains items or if their list of items available for sale contains items, the system sends an Email to the user requesting the user to log in to the system and confirm that the user still desires to buy or sell the items on the respective lists. If a user fails to confirm items of the need list or sell list, then they are put in a deactivated state, and temporarily removed from the database of needed items and items available for sale (24 in FIG. 1). A flowchart of a background routine that performs this periodic checking function is shown in FIG. 9.

Figure 9:
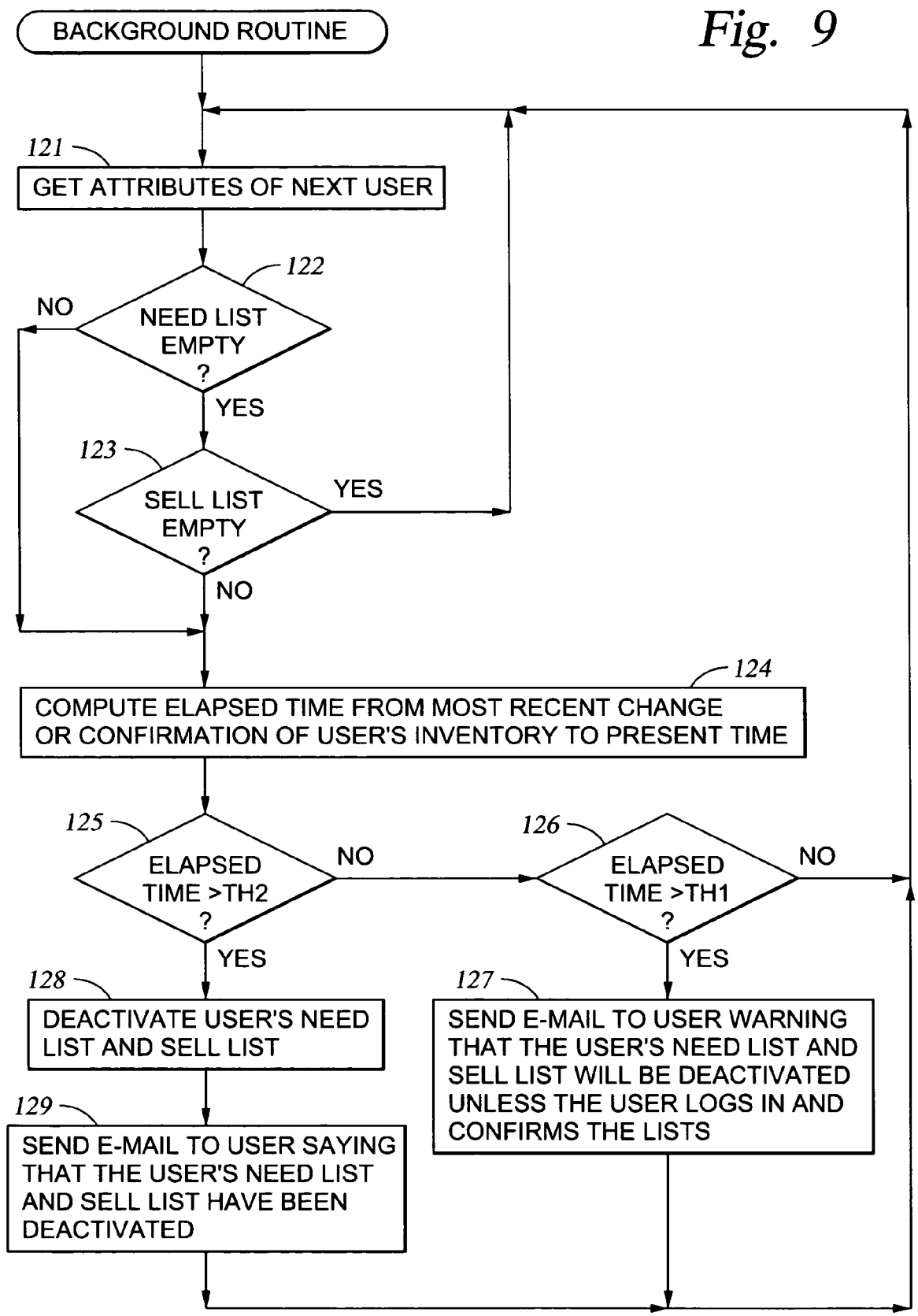
FIG. 9 is a flow chart of a background routine for deactivating the need list and sell list of a user that has not confirmed the needed items list and items available to sell list after expiration of a certain length of time.

In a first step 121 of FIG. 9, the system accesses attributes of the next user, including an attribute indicating whether or not the user's need list is empty, an attribute indicating whether or not the user's sell list is empty, and the "last modified" and "last confirmed" time stamps for the user's inventory, need list, and sell list. In step 122, execution continues to step 123 if the user's need list is empty. In step 123, if the user's sell list is empty, execution loops back to step 121. Otherwise, if the user's sell list is not empty, execution continues to step 124. Execution also continues to step 124 from step 122 if the user's need list is not empty.

In step 124, the system computes the elapsed time from the most recent change or confirmation of the user's inventory to the present time. Then in step 125, the system compares the elapsed time to a relatively large threshold (TH2), such as three months. If the elapsed time is greater than the relatively large threshold, then execution continues to step 126. In step 126, the system compares the elapsed time to a smaller threshold (TH1), such as two months. If the elapsed time is not greater than the relatively small threshold, then execution loops back to step 121. Otherwise, if the elapsed time is greater than the relatively small threshold, then execution branches to step 127. In step 127, the system sends an E-mail to the user, warning that the user's need list and want list will be deactivated unless the user logs in and confirms the lists. After step 127, execution loops back to step 121.

In step 125, if the elapsed time exceeds the relatively large threshold (TH2), then execution continues from step 125 to step 128. In step 128, the system deactivates the user's need list and sell list. For example, this is done by setting a deactivation attribute for the user, and also removing the user entries of the items of the need list and sell list from the database of needed and for sale items (14 in FIG. 1). Then in step 129, the system sends an E-mail to the user saying that the user's need list and sell list have been deactivated. These lists will remain deactivated until the user logs on to the system and requests reactivation. Reactivation entails placing the items of the user's need list and sell list into the database of needed and for sale items (24 in FIG. 1), and then clearing the deactivation flag for the user. After step 129, execution loops back to step 121 to continue the background routine.

Figure 10:
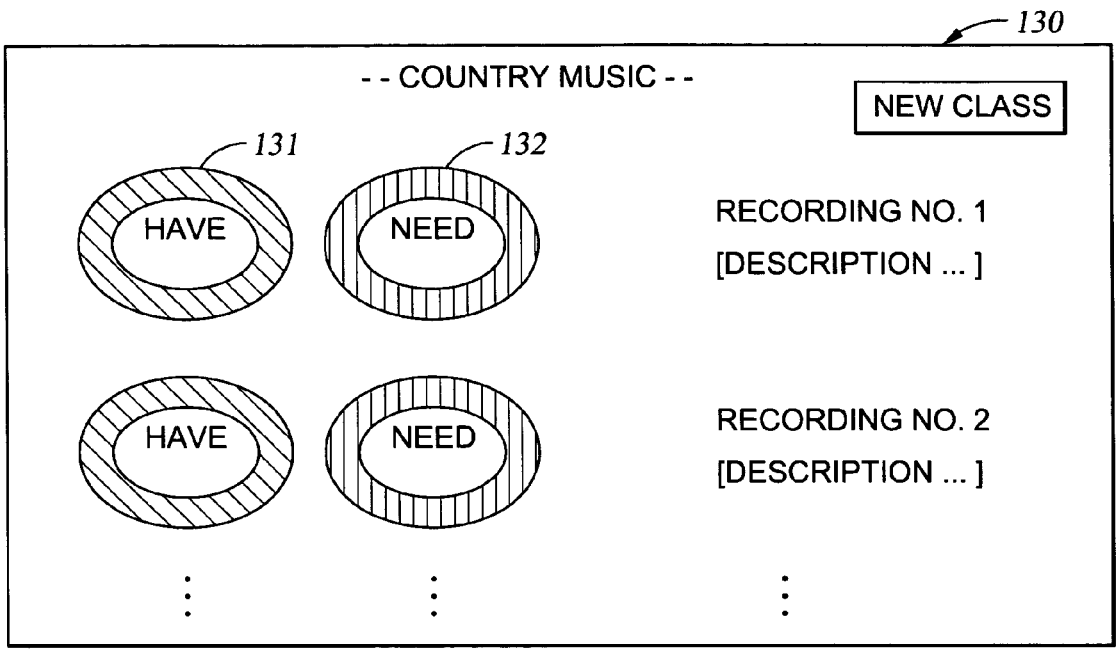
FIG. 10 shows a display screen as seen by a user when browsing the database of collectibles.

FIG. 10 shows a display screen 130 as seen by a user when browsing the database of collectibles. In this example, the user is browsing through the subclass of country music in the primary class of recorded music. The search specification "country music" appears at the top of the screen. The sound recording object classes are listed down the screen on the right as "Recording No. 1," "Recording No. 2," etc. To the left of each object class name and description is a green "Have" oval 131 and a red "Need" oval 132. The user can view all of the sound recording object classes by paging down through screens similar to the screen 130 in FIG. 10. In this example, the user is viewing the sound recording object classes in order to add sound recordings to his or her inventory. When the user finds a sound recording object class for an item that the user has, the user operates a mouse or other pointing device to click on the "Have" oval to the left of the object class name and description, causing the screen to change to a have-instance entry screen (see FIG. 11). When the user finds a sound recording that the user needs, the user clicks on the "Need" oval to the left of the object class name and description, causing the screen to change to a need-instance entry screen (see FIG. 12).

Figure 11:
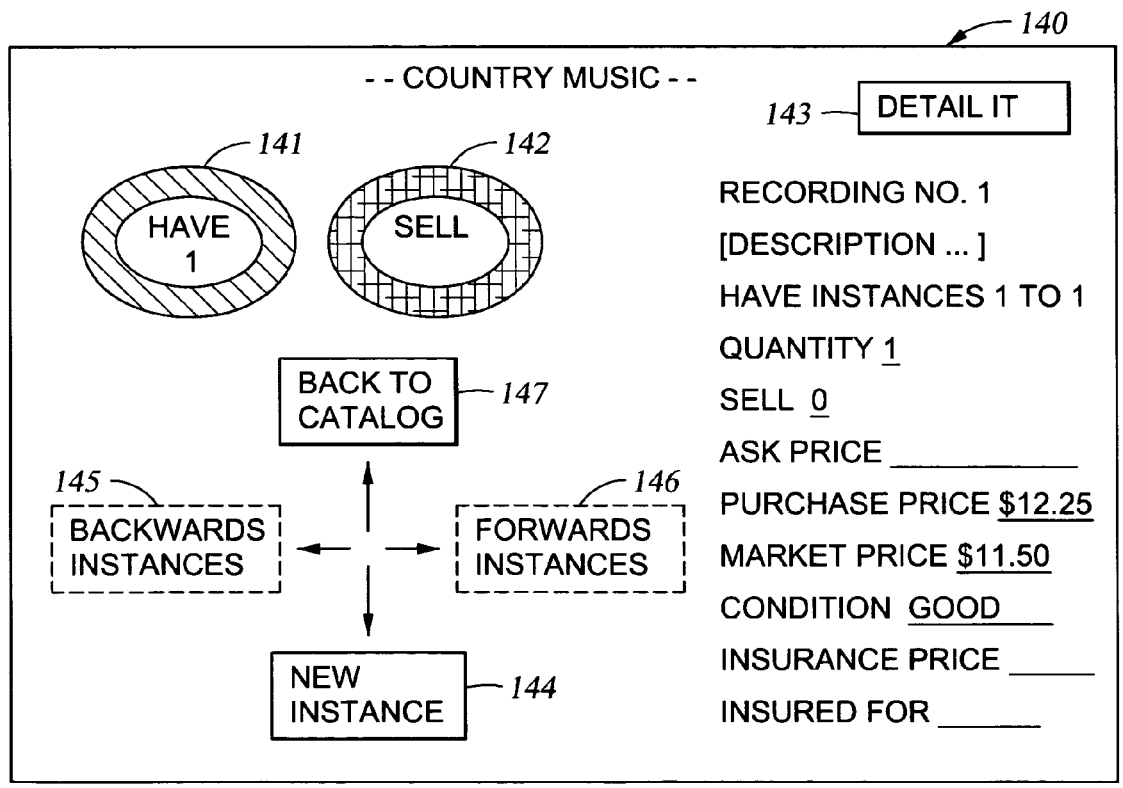
FIG. 11 is a display screen as seen by the user for entering a "have" instance.

FIG. 11 is a display screen 140 as seen by the user for entering a "Have" instance. The screen has the class name "country music" and an object class name and description. To the left of the class name and description is a green "Have" oval 141 and a yellow "Sell" oval. The user can click on the "Have" oval 141 to increase the number of have instances for the object class, and the "Have" oval then indicates the number of have instances. For the screen 140 in FIG. 11, the user has clicked once on the "Have" oval 141, causing it to change from "Have" to "Have 1". The user can click on the "Sell" oval 142 a selected number of times to offer a selected number of the have instances for sale. The screen 140 has additional fields indicating a range of instances, a quantity of instances for the screen, a quantity of sell instances for the screen, an ask price, a purchase price, a market price, a condition, an insurance price, and an "insured for" field. The "insured for" field may indicate insurance that the user had on the item before entering the item (and the insured for amount) into the user inventory, or the "insured for" field may indicate a level of insurance that the user has purchased by using the collectibles management system, in which case the system may automatically fill in the "insured for" field. In this example, each "have instance" screen shows attributes for the indicated quantity of instances. The screen 140 further includes a "Detail" button 143 that the user can click on to obtain further details, such as default settings, for the have instances.

The "Have" and "Sell" buttons indicate a total number of instances for the object class. The total number of instances for the object class can exceed the quantity for a single screen, because there may be more than one have-instance screen for any one object class. Typically this would occur because the user has a number of instances of an object class and some of these instances have different conditions. When the user wants to continue adding instances for the same object class but for a different condition, the user clicks on a "new instance" button 144 to present another have-instance screen. In this fashion, the user can create any number of have instance screens for any one object class. The user can then browse through and edit the have instance screens by clicking on a "backwards instances" button 145 and a "forwards instances" button 146. The user can delete instance screens by editing the "quantity" field to zero. When the user is finished creating and editing the instance screens for an object class, the user clicks on a "back to catalog" button 147.

Figure 12:
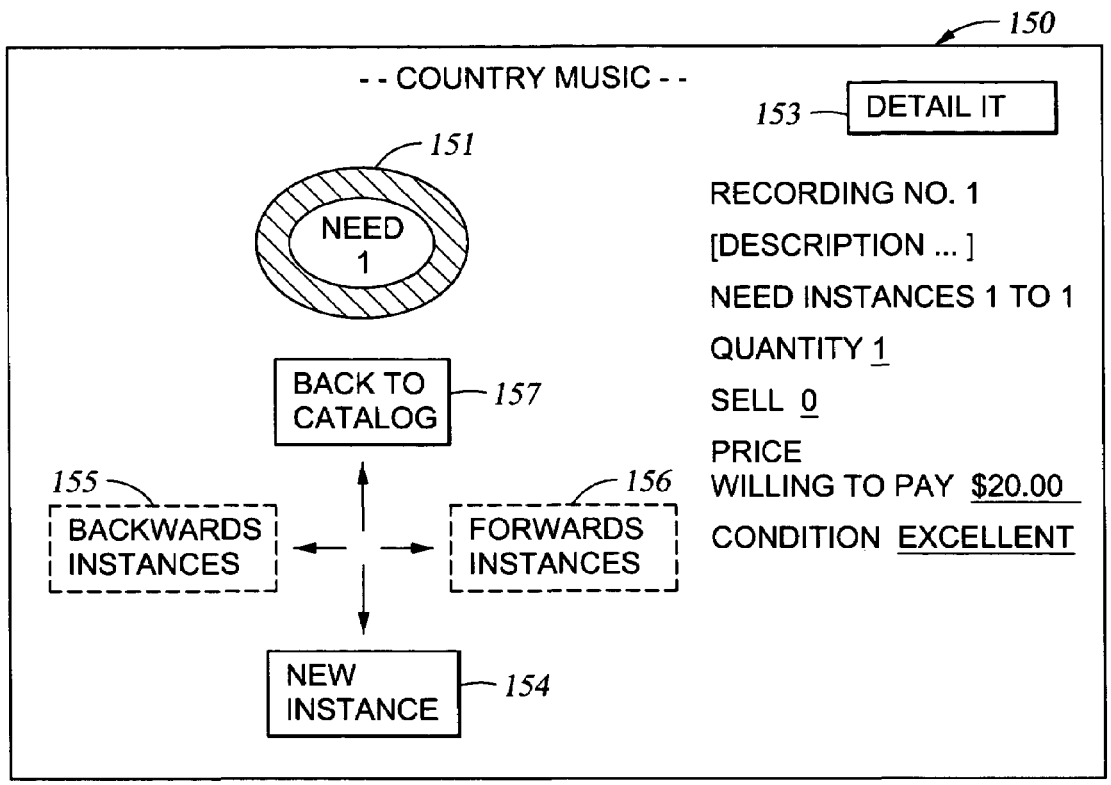
FIG. 12 shows a display screen as viewed by a user during entry of a "need" instance.

FIG. 12 shows a display screen as viewed by a user during entry of a "Need" instance. The screen has the class name "country music" and an object class name and description. To the left of the class name and description is a red "Need" oval 151. The user can click on the "Need" oval 151 to increase the number of need instances for the object class, and the "Need" oval then indicates the number of need instances. For the screen 150 in FIG. 12, the user has clicked once on the "Need" oval 151, causing it to change from "Need" to "Need 1". The screen 150 has additional fields indicating a range of instances, a quantity of need instances for the screen, a bid price, and a condition. The user is prompted to fill in the price they are willing to pay, but a price of zero is acceptable and means that the user is unsure of the price and will review the item found having the lowest ask price that is at least equal to the condition specified in the need instance. In this example, each need-instance screen shows attributes for the indicated quantity of instances. The screen 150 further includes a "Detail" button 153 that the user can click on to obtain further details, such as default settings, for the need instances. For example, rather than asking the user to specify the number of instances to be sold, the user could choose to edit a sell indicator having a default of "no" meaning do not sell any of these; "1" meaning sell all instances for the screen except one; and "yes" meaning sell all of the instances for the screen.

The "Need" oval 151 indicates a total number of need instances for the object class. This total number can exceed the quantity for a single screen, because there may be more than one need-instance screen for any one object class. Typically this would occur because the user would want a number of instances having different conditions. When the user wants to continue adding need instances for the same object class but for a different condition, the user clicks on a "new instances" button 154 to present another need-instance screen. In this fashion, the user can create any number of need-instance screens for any one object class. The user can then browse through and edit the need instance screens by clicking on a "backwards instances" button 155 and a "forwards instances" button 156. The user can delete instance screens by editing the "quantity" field to zero. When the user is finished creating and editing the instance screens for an object class, the user clicks on a "back to catalog" button 157.

Figure 13:
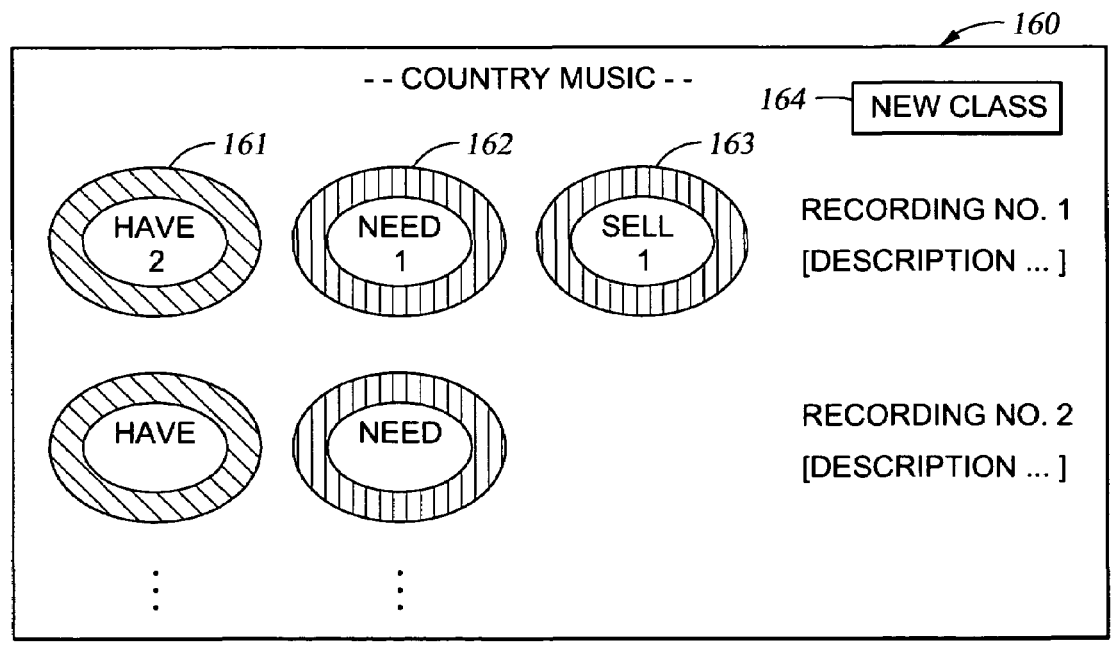
FIG. 13 shows a display screen of the database of collectibles after the user has entered two have instances and one need instance of a recording item.

FIG. 13 shows a display screen of the database of collectibles after the user has entered two "have" instances and one "need" instance of the first recording object class. In this example, the green "Have" oval 161 indicates "Have 2," the red "Need" oval 162 indicates "Need 1", and the yellow "Sell" oval 163 indicates "Sell 1." The user can click on any of these ovals 161, 162, and 163 to go back to either the first instance screen of a have instance, need instance or sell instance of the first recording object class.

Figures 14, 22:
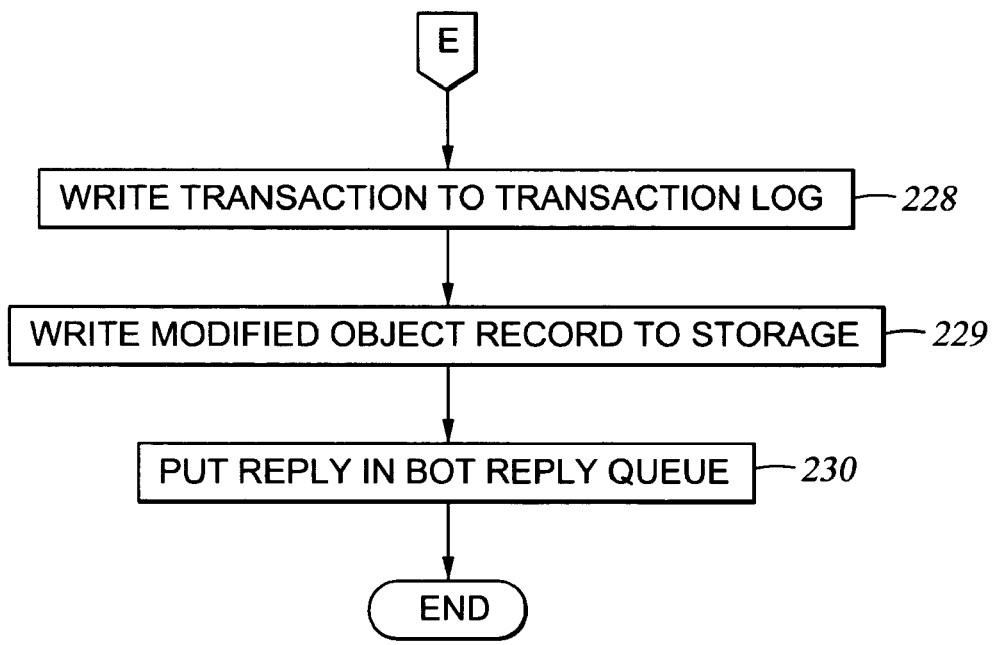
FIG. 14 shows a display screen for adding a class to the database of collectibles for an object class not listed in the database.
FIG. 22 is a second sheet of the flow chart begun in FIG. 21.

In the screen 160 of FIG. 13, the user can click on a "new class" button 164 for creation of a new class similar to the classes shown in the screen 160. For example, if the user clicks on the "new class" button 164 for the screen 160, the system assumes that the user would like to create a new recording class of country music, and the system displays a new class entry screen 165 as shown in FIG. 14. This new class entry screen 165 has fields to permit the user to enter a title, artist, label, and uniform product code (UPC) for the new recording class. The new class entry screen 165 also has an "approved" field that is by default "no" and can be changed to "yes" only by a category specialist. Once approved by the category specialist, the new class entry will appear in the database of collectibles for all users. Until the new class is approved by the category specialist, the new class entry will only appear in the database of collectibles for the user who created it or for a category specialist or the systems administrator. Before approval by the category specialist, a user can create "Have," "Need," and "Sell" instances of a new class of objects that the user has created. To do this, the user clicks on a "back to catalog" button 166 on the new class screen 165, and then the user clicks on "have" and "need" buttons that will be associated with the new object class that will be listed on the display screen (160 in FIG. 13) of the database of collectibles.

Figure 15:
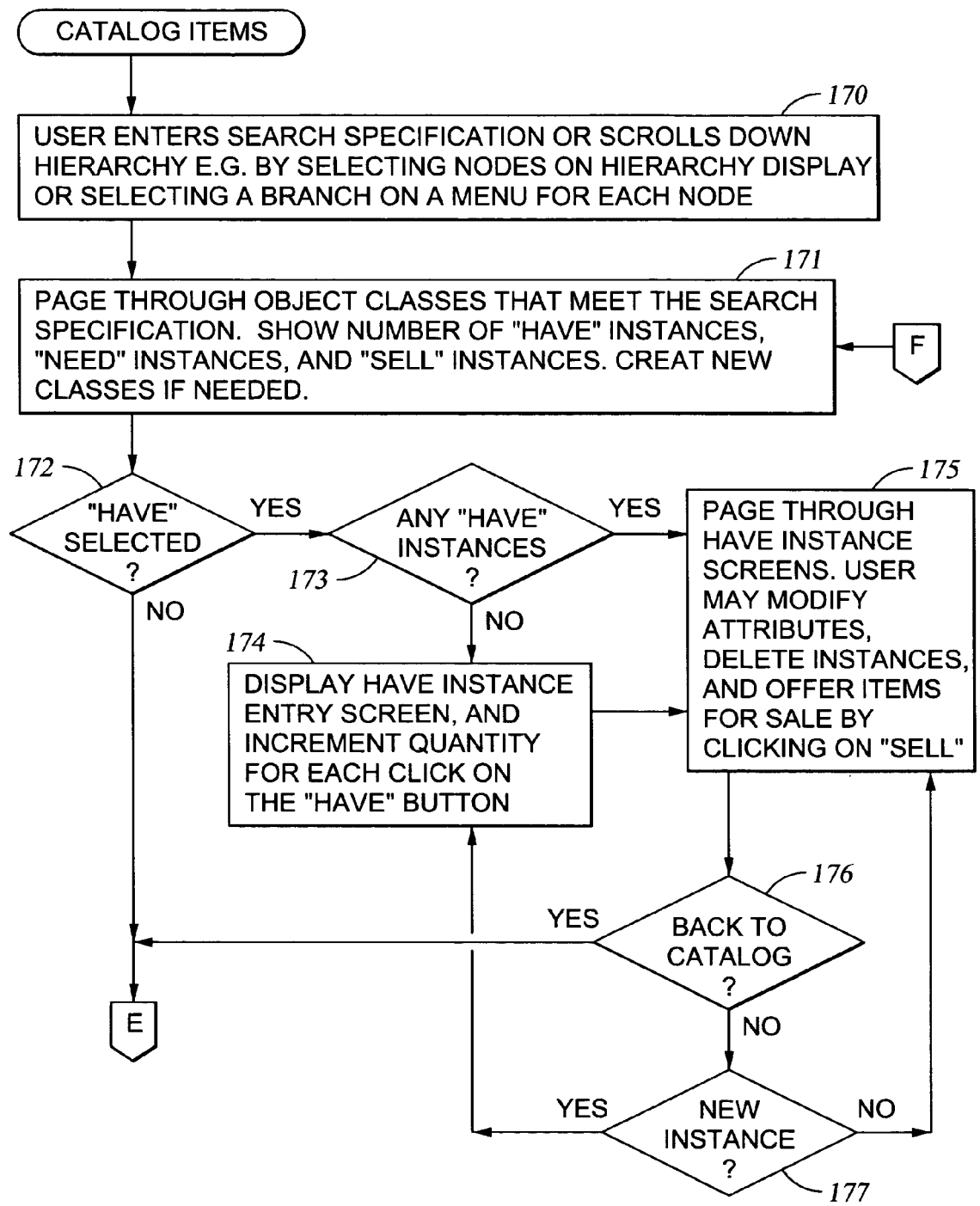
FIG. 15 is a first sheet of a flow chart showing how a user navigates through the database of collectibles and the user's inventory of collectibles.

FIG. 15 is a first sheet of a flow chart showing how a user navigates through the database of collectibles and the user's inventory of collectibles. In a first step 170, the user enters a search specification, such as a primary class or subclass, or the user scrolls down the hierarchy of the database of collectibles, for example, by selecting nodes on a display of the hierarchy, or by successively selecting a branch on a menu for each node, beginning with a menu of the primary classes. Then, in step 171, the user pages through objects classes that meet the search specification, while the system shows the user the number of "Have" instances, "Need" instances, and items for sale instances (see also FIG. 13). In step 172, execution branches to step 173 if the user clicks on the "Have" oval.

In step 173, execution branches to step 174 if there are no have instances associated with the "Have" oval. In step 174, the system displays the "Have" instance entry screen (see also FIG. 11), and increments the quantity of instances for the screen for each click on the "Have" oval. Execution continues from step 174 to step 175. Execution also continues from step 173 to step 175 if there are any have instances.

In step 175, the user pages through the have instance screens. The user may modify attributes, delete instances (by editing the quantity field to zero), and offer items for sale by clicking on the "Sell" oval. Execution continues from step 175 to step 176. In step 176, execution continues to step 177 unless the user selects the "back to catalog" button. In step 177, execution loops back to step 174 if the user selects the "New Instances" button, or otherwise loops back to step 175. If the "Have" oval is not selected in step 172, or if the "back to catalog" button is selected in step 176, then execution continues in step 178 of FIG. 16.

Figure 16:
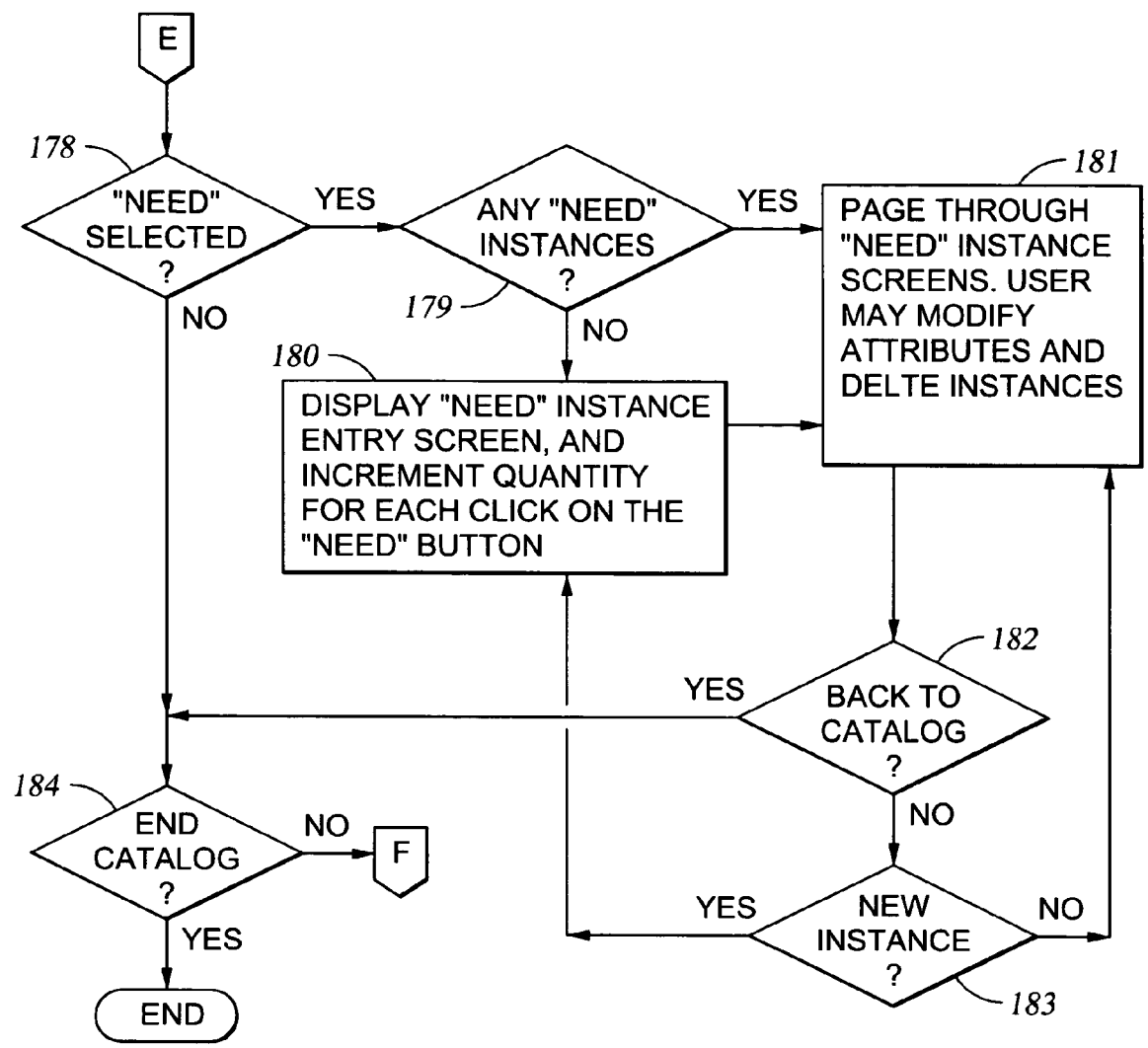
FIG. 16 is the second sheet of the flow chart begun in FIG. 15.

In step 178 of FIG. 16, execution branches to step 179 if the user selects a "Need" oval. Execution branches to step 180 if there are no "Need" instances associated with the "Need" oval. In step 180, the system displays the need instance entry screen (see also FIG. 12), and increments the quantity of instances for the screen for each click on the "Need" oval. Execution continues from step 180 to step 181. Execution also continues from step 179 to step 181 if there are any need instances.

In step 181, the user pages through the need instance screens. The user may modify attributes and delete instances (by editing the quantity field to zero). Execution continues from step 181 to step 182. In step 182, execution continues to step 183 unless the user selects the "back to catalog" button. In step 183, execution loops back to step 180 if the user selects the "new instances" button, or otherwise loops back to step 181. If the "Need" oval is not selected in step 178, or if the "back to catalog" button is selected in step 182, then execution continues in step 184. In step 184, execution loops back to step 171 of FIG. 15 unless the user ends the catalog items function, for example, by selecting another function on a tab or pull-down menu.

Figure 17:
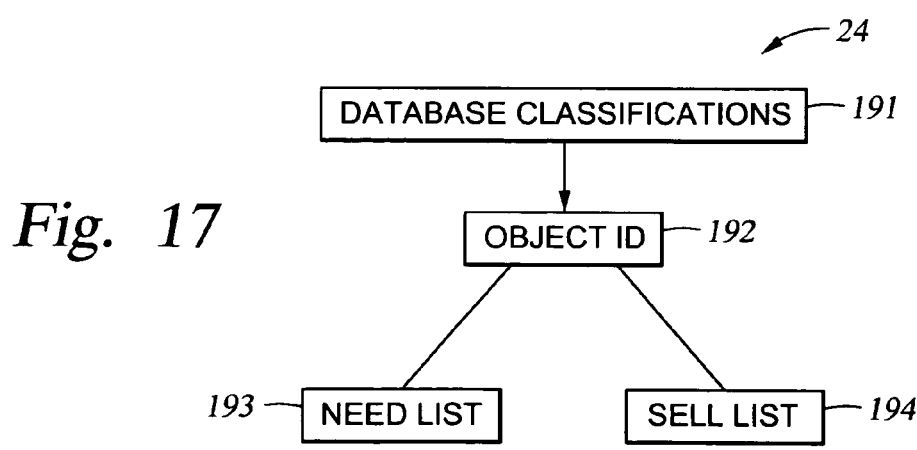
FIG. 17 shows in more detail the data structure of the database of needed items and items available for sale.
Figure 18:
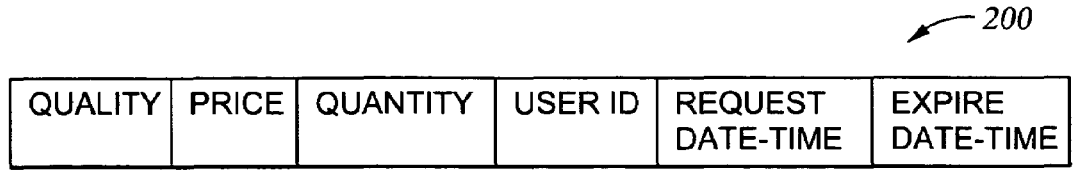
FIG. 18 is a block diagram for an entry in the needed items list or the items available for sale list of the data structure of FIG. 17.

FIG. 17 shows in more detail the data structure of the database 24 of needed and for sale items. The database includes database classifications 191 and a set of variable-length object records, each including an object ID 192, a need list 193 of items needed by users, and a sell list 194 of items available for sale by users FIG. 18 is a block diagram for an entry 200 in the need list (193 of FIG. 17) or the sell list (194 of FIG. 17). The entry 200 includes a quality, ask price, a quantity, a user ID, a request date-time, and an expiration date-time. To facilitate searching of the lists, the entries can be arranged in each list in the following order—first of decreasing quality, second of increasing price, and third of increasing date-time at which the entry is placed on the list.

The user ID could include coded information about the user, such as a credit rating or a feedback rating, that could be used as a limiting criteria for consummating a buy-sell transaction. For example, a buyer may not wish to deal with a seller unless the seller has a certain credit rating or feedback rating. In addition, a seller may not wish to deal with a buyer unless the buyer has a certain credit rating or feedback rating. Moreover, a seller may prefer to do business with a buyer who is prepared to immediately consummate a transaction versus a buyer who only desires to receive an email notification that an item is available (assuming both buyers are willing to pay the same price). Another way of ensuring fair dealing is to permit users to add an image of an item to their inventory, especially for items having an unusual condition or configuration, and to permit an interested purchaser to view the image. Moreover, the database of collectibles could include a library of images, so that the seller would need to add an image of an item to their inventory only if the seller could verify that the image of the item in the library is an accurate depiction of the item being offered for sale, or can describe the difference between the "stock" image and the item available for sale.

The request date-time preferably is the date-time of an original request even through the request may have been modified, for example, to provide corrections or clarifications.

Figure 19:
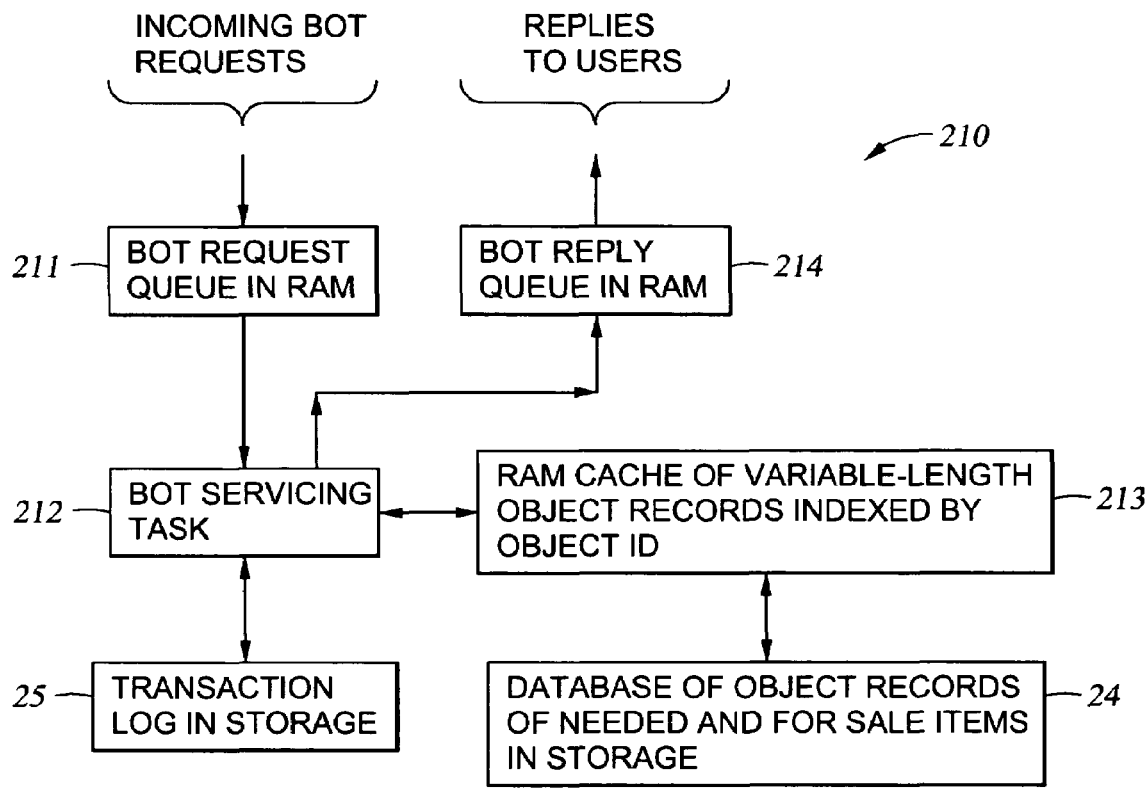
FIG. 19 shows a block diagram of a server-based system for performing buy-sell transactions and maintaining in storage a record of items that are needed by users and available for sale by users.

FIG. 19 shows a block diagram of a server-based system 210 for performing buy-sell transactions and maintaining in storage a record of items needed and items for sale by users. The system 210 accesses the transaction log 25 in storage and the database 24 of object records of needed and for sale items in storage. The system further includes a Bot request queue 211 in random access memory (RAM), a Bot servicing task program 212, a RAM cache 213 of variable-length object records indexed by object ID, and a Bot reply queue 214 in RAM. The Bot servicing task 212 continually looks for matching opportunities for users wanting to sell and wanting to buy items, and it is server based in order to keep users from having to wait on the searching function. Based on their profile, the user will get a notification on-line, emailed or both regarding needed items found and billed or sales or inquiries regarding inventory available for sale in their possession. These notifications will immediately be available to those on-line to maximize instantaneous satisfaction.

Figure 20:
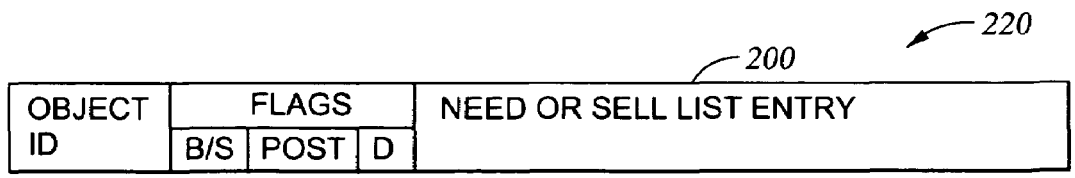
FIG. 20 is a block diagram of an entry in a request queue in the system of FIG. 19.

FIG. 20 is a block diagram of an entry 220 in the Bot request queue (211 FIG. 19). The entry 220 includes an object ID, a set of flags, and a need or sell list entry 200. The flags include at least a buy-sell (B/S) flag indicating whether the entry 220 is either a request to buy an instance of the object class identified by the object ID, a post flag indicating whether or not the request should make any change to the database 24 of needed and for sale items, and a flag (D) indicating whether or not the request is a request to delete an entry from the database of needed and for sale items. Additional flags could be used that would modify the default method of resolving buy-sell requests as described below with reference to FIG. 23. The default method is to execute a buy-sell transaction at the lowest price to the buyer for at least the condition specified, or better. An alternative method would be to report back to the buyer the lowest price items for all of the conditions at or better than the specified condition having prices at or lower than the price the buyer is willing to pay.

Figure 21:
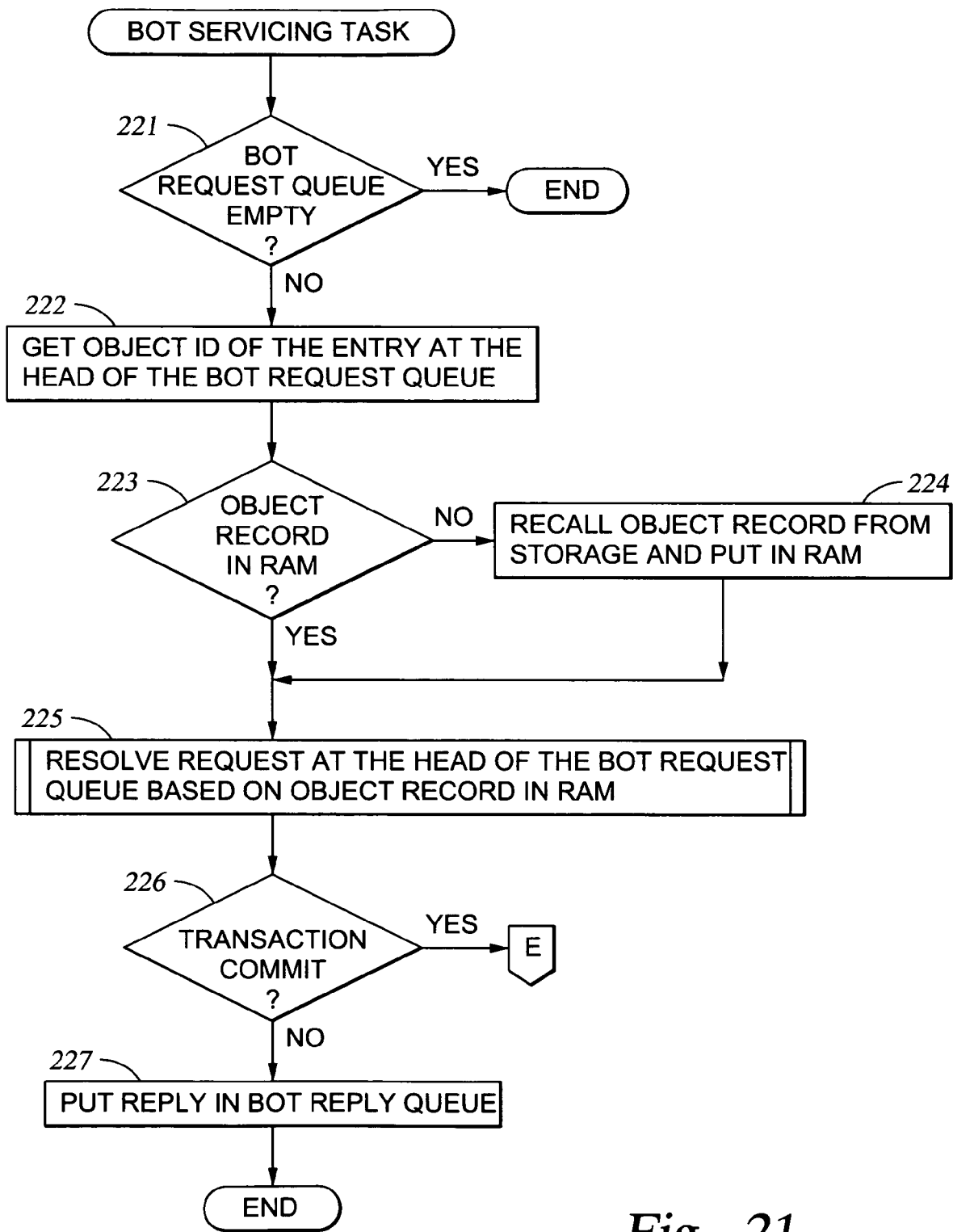
FIG. 21 is a first sheet of a flow chart of a task servicing the request queue in the system of FIG. 19.

FIG. 21 is a first sheet of a flow chart of the task for servicing the Bot request queue. In a first step 221, the task ends if the queue is empty. Otherwise, execution continues to step 222. In step 222, the task gets the object ID of the entry at the head of the Bot request queue. In step 223, execution branches to step 224 if the object record is not in RAM. In step 224, the object record is recalled from storage and placed in RAM. Execution continues from step 224 to step 225. Execution also continues from step 223 to step 225 if the object record is found in the RAM.

Figure 23:
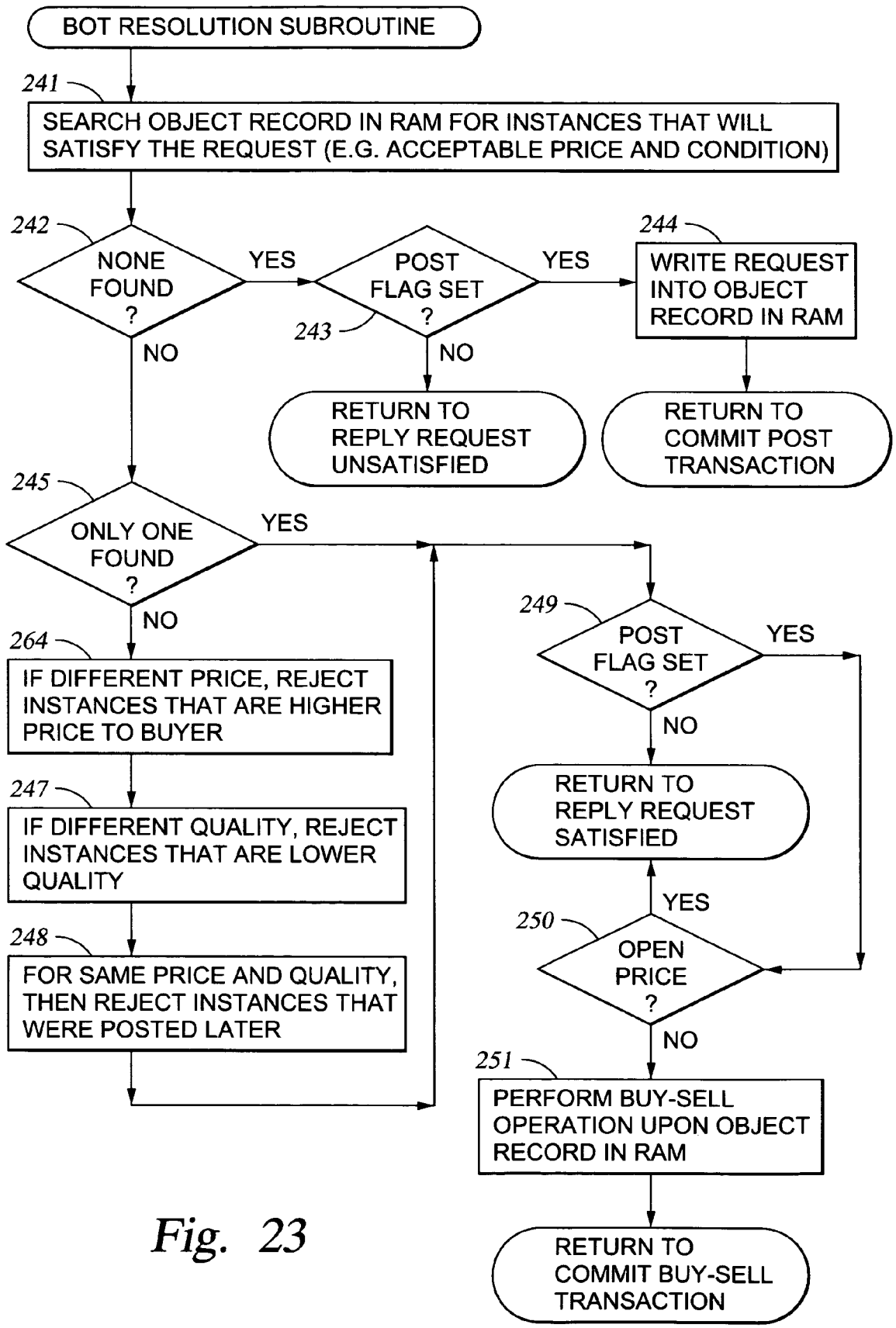
FIG. 23 is a flow chart of a subroutine called for in the flow chart of FIG. 21 for searching and selecting among possible alternatives to satisfying a buy-sell transaction request.

In step 225, the request at the head of the Bot request queue is resolved based on the object record in RAM. For example, if the delete flag is set, the need or sell list entry in the request is deleted from the object record in RAM. If the delete flag is not set, then the request is resolved as shown in FIG. 23 and as further described below. Once the request is resolved, execution continues to step 226. In step 226, execution continues to step 227 if a transaction commit is not needed. A transaction commit is not needed when the object record has not been changed. In step 227 a reply is placed in the Bot request queue, and the Bot servicing task is finished.

If a transaction commit is needed, execution branches from step 226 to step 228 of FIG. 22. In step 228, the task writes the transaction to the transaction log in storage. For example, an entry is written into the transaction log including the object record as it was before modification for the transaction, and a copy of the request being serviced. Next, in step 229, the task writes the modified object record to storage. Finally, in step 230, the task puts a reply into the Bot reply queue, and the task has finished servicing the request from the Bot request queue. In practice, the Bot servicing task would be resumed at a next task scheduling interval once any higher priority tasks are finished.

FIG. 23 is a flow chart of a subroutine called in step 225 of FIG. 21 for searching and selecting among possible alternatives to satisfying a buy-sell transaction request. In a first step 241 of FIG. 23, the object record in RAM for the object ID of the request is searched for instances that will satisfy the request. For example, the request will be satisfied by an instance having an acceptable or open price and an acceptable condition, assuming that the buyer will accept an instance from the seller that is at least as good as the condition sought by the buyer. In step 242, execution continues to step 243 if no satisfactory instances are found in the object record. In step 243, if the post flag is not set, execution returns to reply that the request is unsatisfied. Otherwise, if the post flag is set, execution branches from step 243 to step 244. In step 244, the need or sell list entry in the request is written into the need or sell list of the object record in the RAM, and execution returns to commit the post transaction.

If in step 242 at least one satisfactory instance was found in the object record, then execution continues to step 245. In step 245, execution continues to step 246 if more than one satisfactory instance was found in the object record. In step 246, for satisfactory instances in the object record having different prices, instances are rejected that are a higher price to buyer. In this comparison, an open price is considered to have a higher price to the buyer. Then, in step 247, for satisfactory instances in the object record having the same price but different quality, instances are rejected that have the lower quality. Then, in step 248, for satisfactory instances in the object record having the same price and quality, instances are rejected that were posted later. Execution continues from step 248 to step 249. Execution also continues to step 249 from step 245 if only one satisfactory instance is found in the object record.

In step 249, if the post flag is not set, execution returns to reply that the request is satisfied. However, no transaction is consummated. In effect, when processing a Bot request having a cleared post flag, the Bot servicing task searches the database of needed and for sale items for the most acceptable instance in the object record, and reports back the search result. In step 249, if the post flag is set, execution continues to step 250. In step 250, if the request has an open price, then execution returns to reply that the request is satisfied. However, the buyer must be willing to accept the price sought by seller or, alternatively, the seller could reduce the price it is willing to accept. If the price is not open, then execution continues from step 250 to step 251 to perform the buy-sell operation upon the object record in RAM, typically by deleting the entry in the need or sell list including the most satisfactory instance of the object record. Execution then returns to commit the buy-sell transaction, and to place a reply in the Bot reply queue. The Bot reply queue is serviced so that any item that is purchased through this matching concept is automatically removed from the seller's inventory, the buyer's need list, and added to the buyer's inventory.

The Bot serving task can handle the following matching scenarios. In the first scenario, the needed item is found for a set price that is lower than the buyer's maximum price. The transaction is consummated by notifying buyer and seller, adding the item to the buyer inventory, removing it from the seller inventory, and charging the $x to the buyer's credit card on file. The $x is a matrix based on the sales price. Notification happens on email and/or "BotNote" which can be modifiable and specified by user. The user can specify email only, BotNote only, or both or BotNote only when on-line. The "BotNote" is something always on the screen that states: "You have 'x' BotNotes." When the user clicks on the message, the notes are displayed for review. These notes are the messages from the Bot reply queue regarding transactions or potential transactions.

In a second scenario, a needed item is found for more than the buyer's maximum price. Then the buyer is notified of a potential transaction to give the buyer an opportunity to increase the price. This can also go the opposite direction and the seller can get a BotNote regarding interest at a lower price. Notifications take place via the "Bot List" and/or email. Users could set a limit on the number of BotNotes they would like to receive over a period of time. It is also be desirable for the user files to maintain a history of BotNotes received and rejected by the user so that the user is not bothered by BotNotes about offers that are no better than prior offers. The typical user would not want to re-address pricing scenarios previously rejected just because another item has become available. However, a buyer could elect to receive a repeat notification if no other suitable matches have been located after a specified period.

In a third scenario, the needed item is not found. The request is placed in the database of needed and for sale items, until another request comes by that may produce a match.

In a fourth scenario, the needed item is found but buyer didn't specify a price. The item and seller's price is communicated to buyer so that the buyer may elect to purchase the item at the seller's offer price.

In a fifth scenario, the needed item is found but the buyer is not willing to pay the price specified by seller. The seller can be given the opportunity to lower the price it is willing to accept. This can repeat itself, although in the preferred implementation, the system is programmed to limit the extent to which buyers and sellers may negotiate with each other. In particular, the preferred buy-sell philosophy is premised on a "set sales price" as opposed to an auction platform.

In the preferred embodiment, the buy-sell model is similar to a store or mall in which sellers must post a public price for each item offer. The sellers can tell if the posted price is too high by seeing customers that show interest but balk at the posted price. This philosophy is considered most conducive to promoting free and fair exchange of items among a diverse group of users, including sophisticated and unsophisticated individuals, as well as large and small businesses. Buyers may place orders to buy and the orders may specify a price, but the price is not public and it is an upper limit to what a buyer is willing to pay. If a seller happens to offer to sell at a price that is lower than the price that a buyer is willing to pay, the buyer is given the benefit of the difference by requiring the buyer to pay only the seller's offering price. The seller must specify a price in order for the system to process or post an item for sale. The buyer need not specify a price to see if an item is being offered by any seller, and to see at least the lowest price offered by any seller. A seller may see if there are any buyers waiting for an item to purchase, but the seller may not see the maximum price that the buyer is willing to pay. The model discourages haggling over price.

At any time the user may click on his or her "BotNotes," although there must be a number of 1 or greater for the user to successfully click on it and get something back, unless there are archived BotNotes that the user desires to access. Each communication that is made via email is also on the "BotNotes" and can be responded to in that manner as easily as it can be responded to on email. The communications and options for the user include the following: (1) read a note of transaction consummation and information regarding how to contact for shipment/payment; (2) accept a price lower than the user originally requested to sell an item; and (3) increase the price a buyer is willing to pay, or decrease the price a seller is willing to accept for an item.

Figure 24:
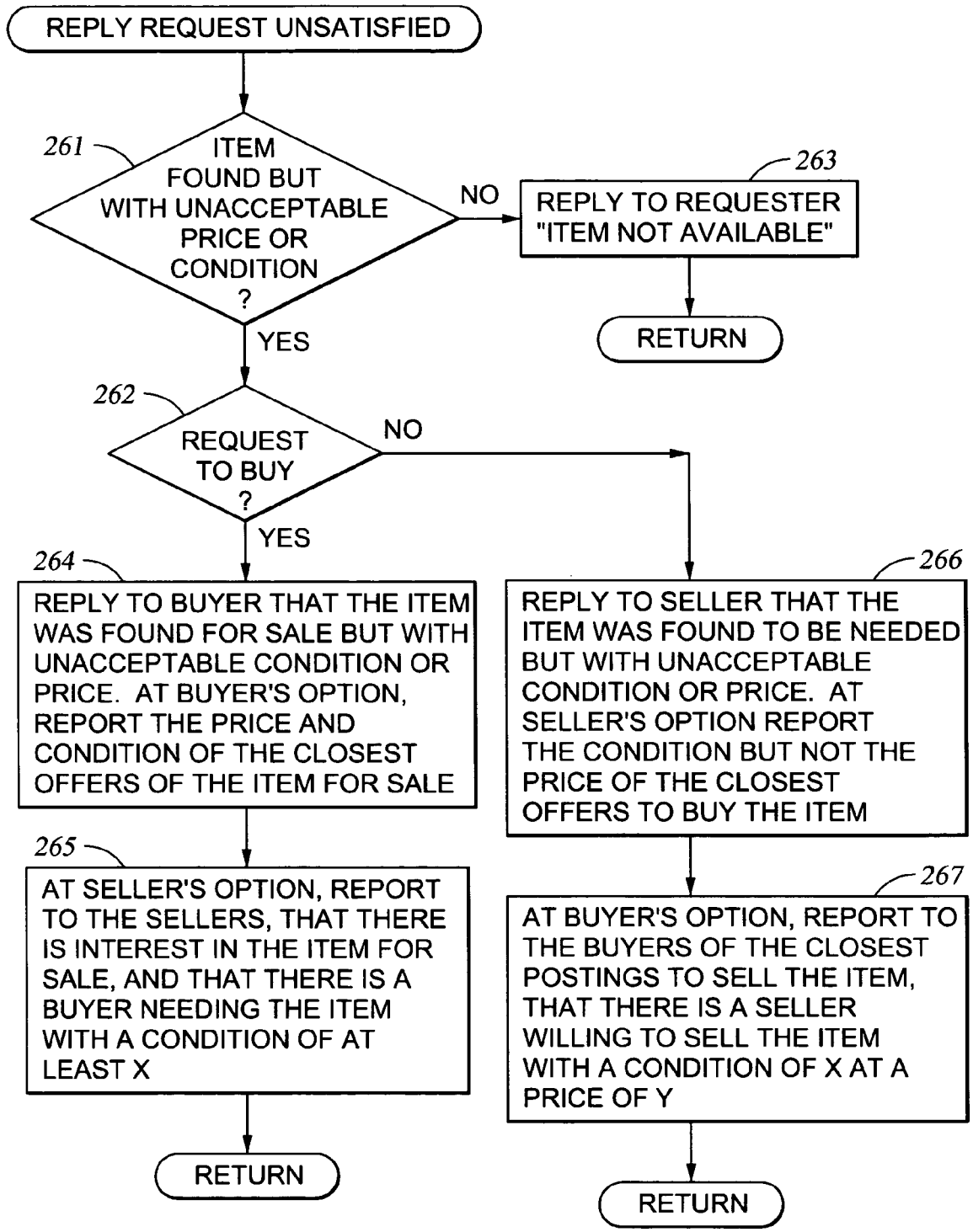
FIG. 24 is a flow chart showing how the task servicing the request queue formulates a reply to a user when the user's request cannot be satisfied.

FIG. 24 is a flow chart showing how the task servicing the request queue replies to a user when a user's request cannot be satisfied. In a first step 261, if the result of searching the database of needed and for sale items was to find a desired item with an unacceptable price or condition, then execution continues to step 262. Otherwise, execution branches to step 263, where the system sends a reply to the requester indicating that the item is not available. After step 163, the routine is finished.

In step 262, if the request is a request to buy an item, then execution continues to step 264. In step 264, the system replies to the buyer that the item was found for sale but with an unacceptable condition or price. The buyer's request may have a flag choosing an option further to report to the buyer the price and condition of the closest offer or offers of the item for sale. For example, the system could send a BotNote to the buyer saying: "the item has been posted for a price of X, in excess of what you were willing to pay." Then, in step 265, at the option of the seller or sellers having posted the item for sale, the system may report to each seller that there is a buyer needing the item with a condition of at least X. A seller's request may have a flag choosing this option, and the flag becomes posted with the seller's request when the seller's request cannot be satisfied immediately and is therefore stored in the database of needed and for sale items. For example, in step 265, the system could send the seller a BotNote saying: "someone is interested in purchasing this item, but they are not willing to pay your price." After step 265, the routine is finished.

If in step 262 the request is a request to sell an item, then execution continues from step 262 to step 266. In step 266, the system replies to the seller that the item was found to be needed (i.e., there was a posted offer to buy) but with an unacceptable condition or price. At the seller's option, the system reports to the seller the condition but not the buyer's offer price of the closest offers to buy the item. Then, in step 267, at the buyer's option, the system reports to the buyers of the closest offers to buy the item, that there is a seller willing to sell the item with a condition of X and a price of Y. After step 267, the routine is finished.

Figure 25:
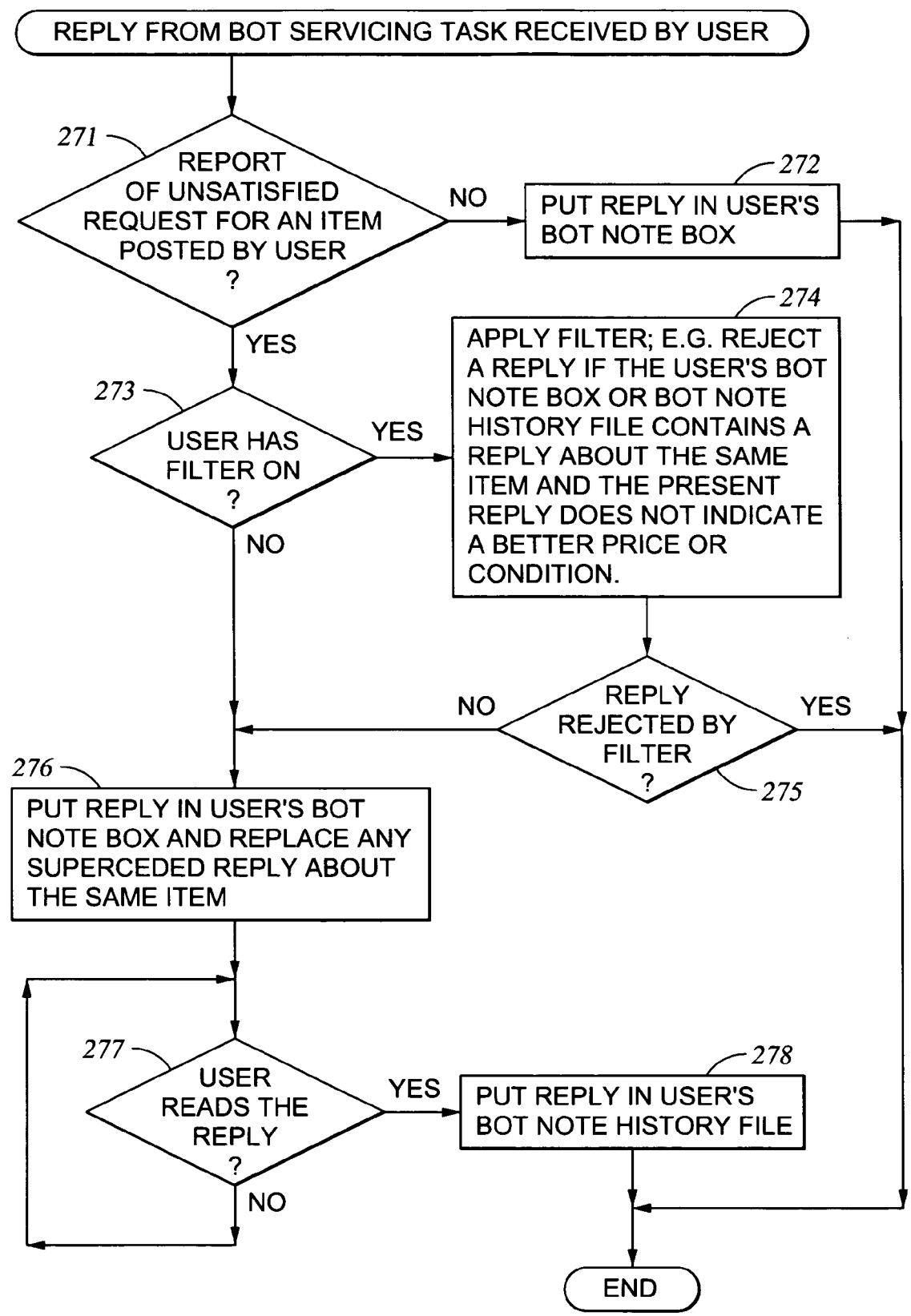
FIG. 25 is a flow chart showing how a user handles replies from the task servicing the buy-sell transaction requests.

FIG. 25 is a flow chart showing how a user handles replies from the Bot servicing task (212 in FIG. 19). In a first step 271 of FIG. 25, the user's computer checks whether the reply is a report of an unsatisfied request for an item that the user had posted. In other words, the user's computer checks whether the reply was produced in response to a request from another user. The user's computer could do this by inspecting a flag in the reply. If the reply is not a report of an unsatisfied request for an item that the user had posted, then execution branches to step 272 to put the reply in the user's BotNote box, and the routine is finished. If the reply is a report of an unsatisfied request for an item that the user had posted, then execution continues from step 271 to step 273. In step 273, execution branches from step 273 to step 274 if the user has turned on a BotNote filter. In step 274, the filter is applied. For example, the filter rejects a reply BotNote if the user's BotNote box or BotNote history file (e.g., a local file on the user's computer) contains a previous reply BotNote about the same item and the present reply BotNote does not indicate a better price or condition for the item. The filter function could be freely specified by the user. For example, the user could use a filter so that the user sees only the first BoxNote about an unsuccessful request about an item, or only about opportunities for the same item of at least the desired quality at a lower price, or only about opportunities for the same item with a greater quality without regard to price. The filter could be different for different items or different categories, so that a user could view more information about possible transactions for more desired items, and less information about possible transactions for less desired items.

Execution continues from step 274 to step 275. In step 275, if the reply was rejected by the filter, then the routine is finished. Otherwise, execution continues to step 276. Execution also continues to step 276 from step 273 if the user does not have the filter turned on.

In step 276, the reply is put in the user's BotNote box. Then in step 277, once the user reads the reply, execution continues to step 278 where the reply is taken from the user's BotNote box and placed in the user's BotNote history file, and the routine is finished.

In view of the above, there has been described an online computer-implemented method and system for permitting users in a data network to manage inventories of their collectibles and to access listings of available collectibles in order to easily identify needed items and to create a need list. In addition, the system enables businesses catering to collectors to easily post their items for sale in an identifiable manner that increases the likelihood of matching an item on another user's need list.

APPENDIX I. SAMPLE DATABASES

User File
User-id
Password
User Type
Name
Address
Sell Indicator Default
Condition Default
Medium Default
Email Address
Password Tip
Correspondency Type
CC Info
Feedback Score Catalog—Sound Recording
Label
Number
Source
Date
Title
Artist
Country
Medium
Special Notes
UPC
Genre
Image
Approved Artist
Artist ID
Name
Bio
Formed Date
Date of Birth
City/State/Country
Specialty
Other Spec
Other Spec 2
Genre
Approved Disc
Label
Number
Artist ID
Role
Approved Price
Date
Label
Number
Condition
Price
UPC Have Inventory
User-id
Label
Number
Qty
Sell Indicator
Purchase Price
Market Price
Condition
UPC
Sell Price
Date
Description
Insurance Price Need Inventory
User-id
Label
Number
Qty
Price
Condition
UPC
Description Feedback
User
User Providing
Type
Comment
Date
Label
Number Insurance Policy
User-id
Renewal Date
Coverage Amount
Carrier Period
Premium Request for Quote (RFQ)
User-id
Name
SSN
Email address
Home Phone
Business Phone
Address
Effective Date
Blanket ($)
Scheduled ($)
Distance to FD
Distance to FH
Type of Residence
FA Alerts Central y/n
FA Alerts Station y/n
FA
Local Only y/n
Smoke/Heat Det y/n
FA Other y/n
Burg Alerts Central y/n
Burg Alerts Police y/n
Burg Local Only y/n
Safe/Vault y/n
Dead Bolts All Doors y/n
Burg Other y/n
Loaned/Exhibited y/n
Days loaned/exhibited
Used Commercially y/n
Residence Attended y/n
Held for Sale y/n
Collection at home y/n
Property Losses (#)
Notes
Affirmation of SU y/n

What is claimed is:

1. Apparatus for permitting a user to access a site on the Internet, the site being accessible to a multiplicity of users for managing inventories of different kinds of things that the users have, the different kinds of things being instances of object classes defined in a computer-implemented database of object classes, and the inventories, of the different kinds of things that the users have, being stored in at least one computer-implemented database of user information, said apparatus comprising:

at least one processor programmed for providing access of a user to the user's inventory for inspecting and for adding instances to the user's inventory by displaying to the user a list of object classes from the database of object classes, and next to an identification of each listed object class, displaying a first button for the user to click on to add, to the user's inventory, instances of the listed object class that the user has, and next to the identification of each listed object class, also displaying a second button for the user to click on to identify instances of the listed object class that the user would like to buy, and for labeling the first button with a number indicating how many instances of the listed object class that the user has;

wherein said at least one processor is further programmed for responding to the user clicking on the first button by incrementing the number indicating how many instances of the listed object class that the user has, and displaying to the user the incremented number indicting how many instances of the listed object class that the user has by labeling the first button with the incremented number; and wherein said at least one processor is further programmed for displaying a third button for the user to identify instances of the listed object class that the user would like to sell, and for labeling the third button with a number indicating how many instances of the listed object class that the user would like to sell.

2. The apparatus as claimed in claim 1, which is programmed for displaying the first button in a first color, displaying the second button in a second color different from the first color, and displaying the third button in a third color different from the second color and different from the first color.

3. A computer-implemented method of a user managing an inventory of different kinds of things that the user has, the different kinds of things being instances of object classes defined in a computer-implemented database of object classes, and the inventory, of the different kinds of things that the user has, being stored in at least one computer-implemented database of user information, said method comprising:

providing access of the user to the user's inventory for inspecting and adding instances to the user's inventory by displaying to the user a list of object classes from the database of object classes, and next to an identification of each listed object class, displaying a first button for the user to click on to add, to the user's inventory, instances of the listed object class that the user has, and next to the identification of each listed object class, also displaying a second button for the user to click on to identify instances of the listed object class that the user would like to buy; and which includes labeling the first button with a number indicating how many instances of the listed object class that the user has; and which further includes responding to the user clicking on the first button by incrementing the number indicating how many instances of the listed object class that the user has, and displaying to the user the incremented number indicting how many instances of the listed object class that the user has by labeling the first button with the incremented number; and which further includes displaying a third button for the user to identify instances of the listed object class that the user would like to sell, and labeling the third button with a number indicating how many instances of the listed object class that the user would like to sell.

4. A computer-implemented method of a user managing an inventory of different kinds of things that the user has, the different kinds of things being instances of object classes defined in a computer-implemented database of object classes, and the inventory, of the different kinds of things that the user has, being stored in at least one computer-implemented database of user information, said method comprising:

providing access of the user to the user's inventory for inspecting and adding instances to the user's inventory by displaying to the user a list of object classes from the database of object classes, and next to an identification of each listed object class, displaying a first button for the user to click on to add, to the user's inventory, instances of the listed object class that the user has, and which includes labeling the first button with a number indicating how many instances of the listed object class that the user has, and responding to the user clicking on the first button by incrementing the number indicating how many instances of the listed object class that the user has, and displaying to the user the incremented number indicting how many instances of the listed object class that the user has by labeling the first button with the incremented number indicting how many instances of the listed object class that the user has; and next to the identification of each listed object class, also displaying a second button for the user to click on to identify instances of the listed object class that the user would like to buy, and labeling the second button with a number indicating how many instances of the listed object class that the user would like to buy, and responding to the user clicking on the second button by incrementing the number indicating how many instances of the listed object class that the user would like to buy; and which further includes displaying a third button for the user to identify instances of the listed object class that the user would like to sell, and labeling the third button with a number indicating how many instances of the listed object class that the user would like to sell.

5. Apparatus for permitting a user to access a site on the Internet, the site being accessible to a multiplicity of users for managing inventories of different kinds of things that the users have, the different kinds of things being instances of object classes defined in a computer-implemented database of object classes, and the inventories, of the different kinds of things that the users have, being stored in at least one computer-implemented database of user information, said apparatus comprising:

at least one processor programmed for providing access of a user to the user's inventory for inspecting and for adding instances to the user's inventory by displaying to the user a list of object classes from the database of object classes, and next to an identification of each listed object class, displaying a first button for the user to click on to add, to the user's inventory, instances of the listed object class that the user has;

wherein said at least one processor is further programmed for labeling the first button with a number indicating how many instances of the listed object class that the user has, and for responding to the user clicking on the first button by incrementing the number indicating how many instances of the listed object class that the user has, and displaying to the user the incremented number indicting how many instances of the listed object class that the user has by labeling the first button with the incremented number indicating how many instances of the listed object class that the user has;

wherein said at least one processor is further programmed for displaying, next to the identification of each listed object class, a second button for the user to click on to identify instances of the listed object class that the user would like to buy, and for labeling the second button with a number indicating how many instances of the listed object class that the user would like to buy, and for responding to the user clicking on the second button by incrementing the number indicating how many instances of the listed object class that the user would like to buy, and displaying to the user the incremented number indicting how many instances of the listed object class that the user would like to buy by labeling the second button with the incremented number indicating how many instances of the listed object class that the user would like to buy; and wherein said at least one processor is further programmed for displaying a third button for the user to identify instances of the listed object class that the user would like to sell, and labeling the third button with a number indicating how many instances of the listed object class that the user would like to sell.

* * * * *